United States Patent [19]

Wilkes et al.

[11] 4,058,676
[45] Nov. 15, 1977

[54] SPEECH ANALYSIS AND SYNTHESIS SYSTEM

[75] Inventors: Arthur L. Wilkes, Woodland Hills; Fred B. Wade, Ventura; Robert L. Thompson, Thousand Oaks, all of Calif.

[73] Assignee: International Communication Sciences, Woodland Hills, Calif.

[21] Appl. No.: 593,861

[22] Filed: July 7, 1975

[51] Int. Cl.² .............................................. G10L 1/00
[52] U.S. Cl. .................................................. 179/1 SA
[58] Field of Search .......................... 179/1 SA, 1 SM

[56] References Cited
U.S. PATENT DOCUMENTS

| 3,505,601 | 4/1970 | Sloymaker | 179/1 SA |
|---|---|---|---|
| 3,624,302 | 11/1971 | Atal | 179/1 SA |
| 3,649,765 | 3/1972 | Rabiner et al. | 179/1 SA |
| 3,909,533 | 9/1975 | Williman | 179/1 SA |
| 3,927,268 | 12/1975 | Sciulli et al. | 179/15 AS |

OTHER PUBLICATIONS

Shafer, Rabiner, "Digital Representations of Speech Signals", Proc. IEEE, Apr. 1975.

Flanagan, "Speech Analysis, Syntheses, and Perception", 2nd ed., Springer-Verlag, 1972.

Primary Examiner—Kathleen H. Claffy
Assistant Examiner—E. S. Kemeny
Attorney, Agent, or Firm—Fulwider, Patton, Rieber, Lee & Utecht

[57] ABSTRACT

Method and apparatus for speech analysis and synthesis adapted for analyzing and multiplexing speech signals from a plurality of voice grade telephone lines for further transmission through a single voice grade telephone line. A plurality of specialized digital signal processing techniques are employed to analyze in real time four speech channels in parallel and multiplex speech frame parameters of the channels into a single data output channel for transmission through a suitable media. The received data channel is demultiplexed and the speech frame parameters for the individual channels are utilized to synthesize, in parallel, the four speech signals. Certain of the digital processing techniques utilize the characteristics of speech signals to truncate conventional signal processing time while other processing techniques are substantially statistical analyses of speech to resolve ambiguities, particularly in making the voiced/unvoiced decision for a frame of analyzed speech data.

92 Claims, 26 Drawing Figures

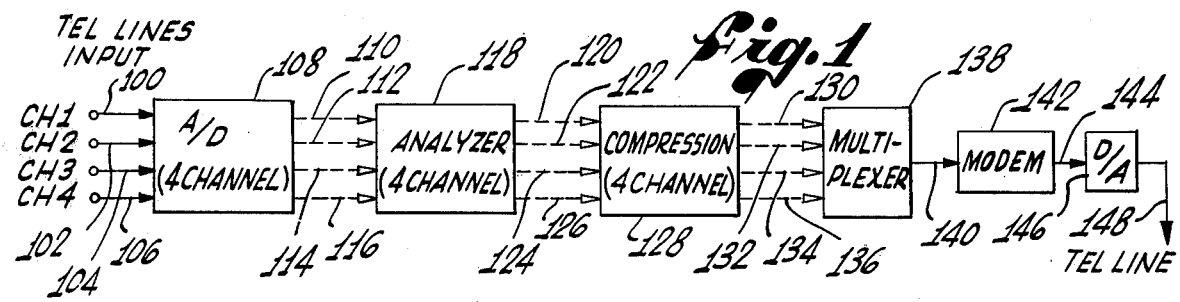
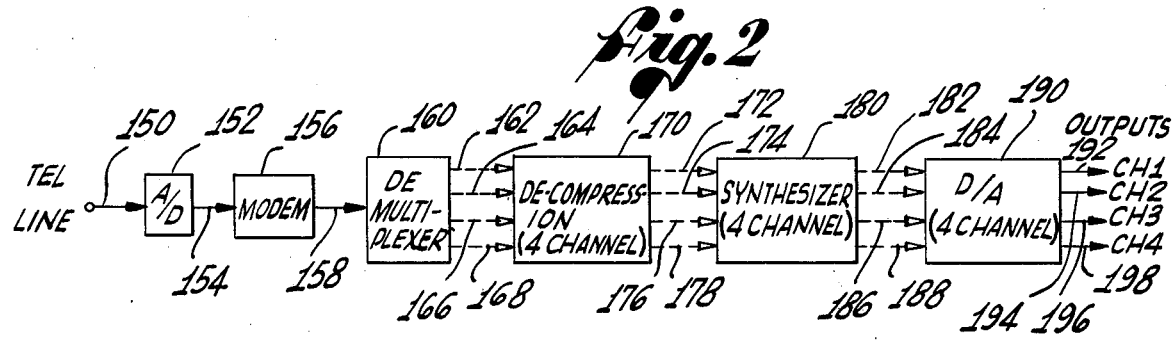
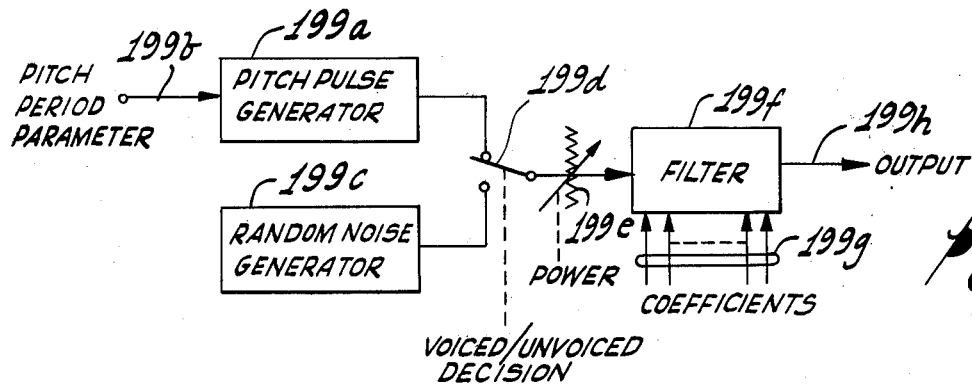
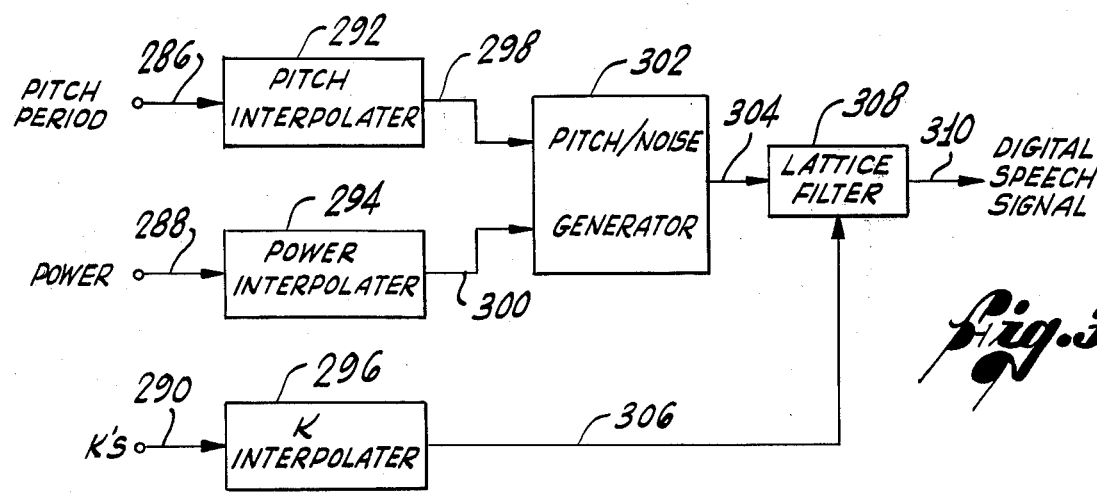

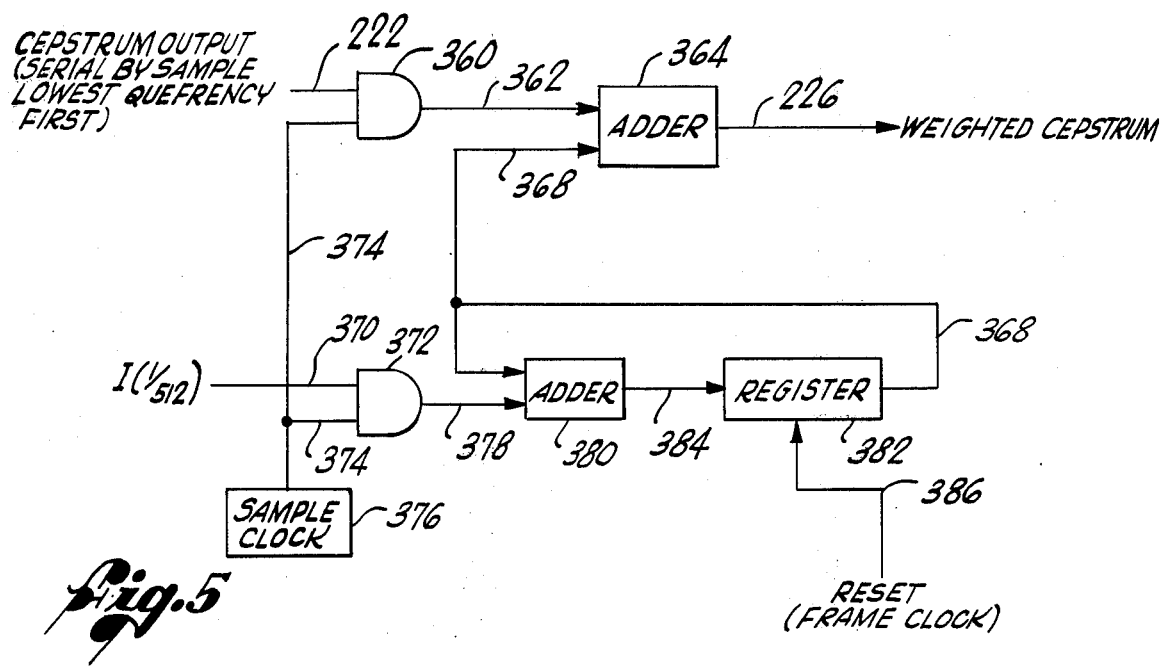
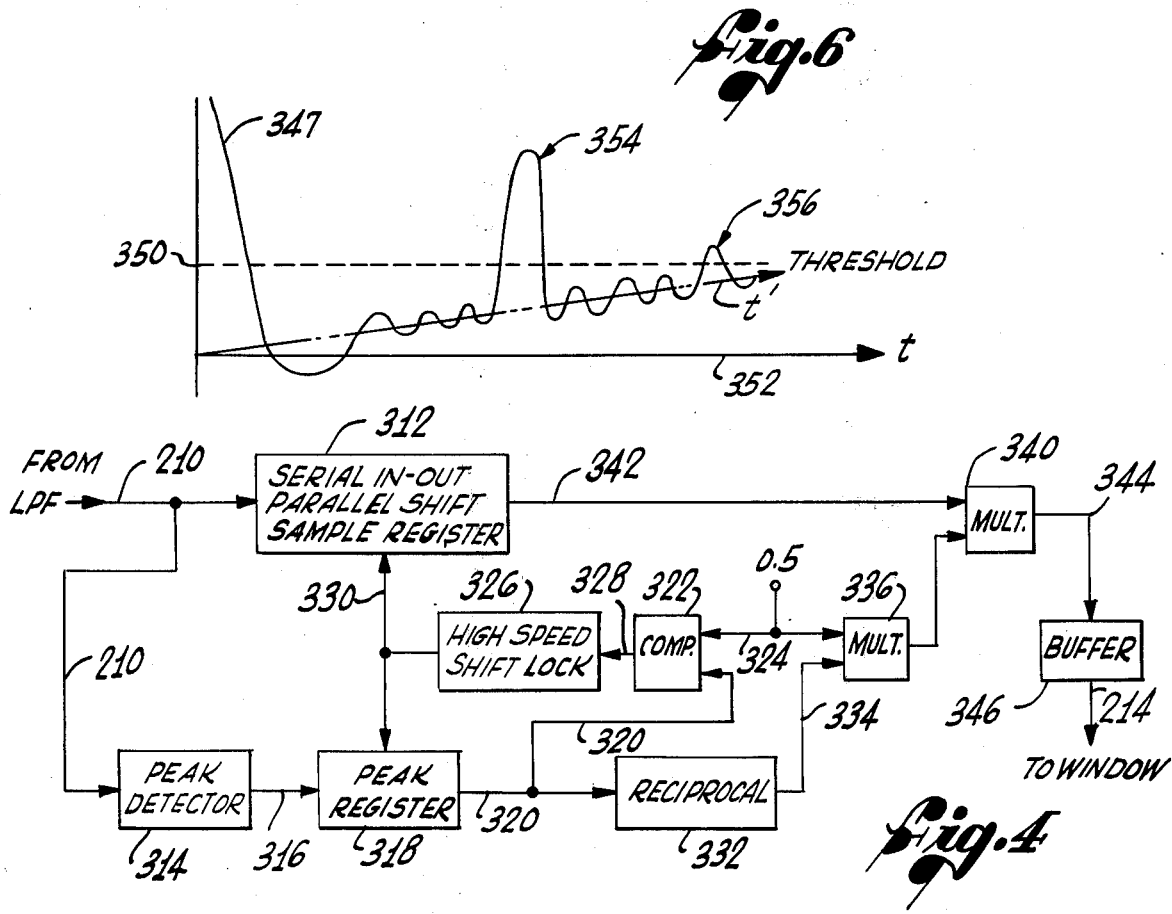

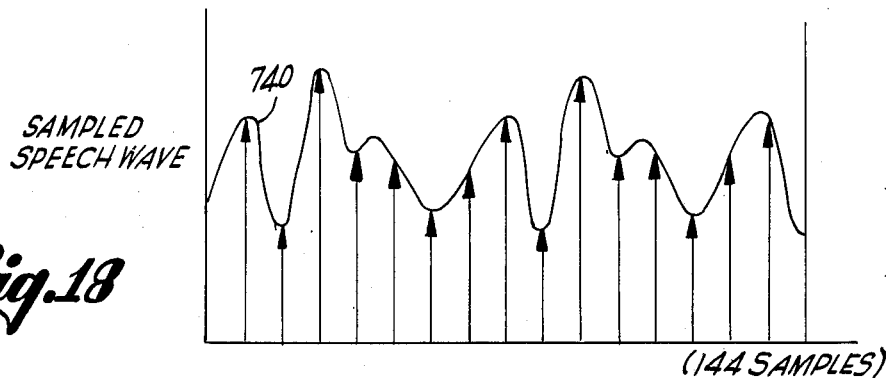
*Fig.18* SAMPLED SPEECH WAVE
740
(144 SAMPLES)
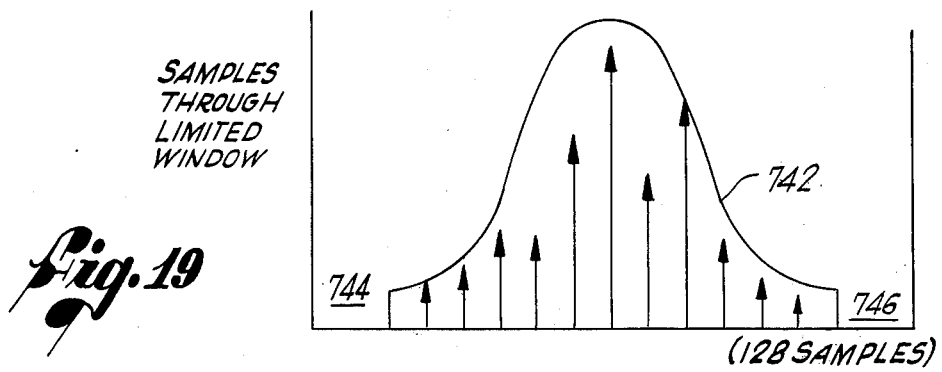
*Fig.19* SAMPLES THROUGH LIMITED WINDOW
742
744   746
(128 SAMPLES)
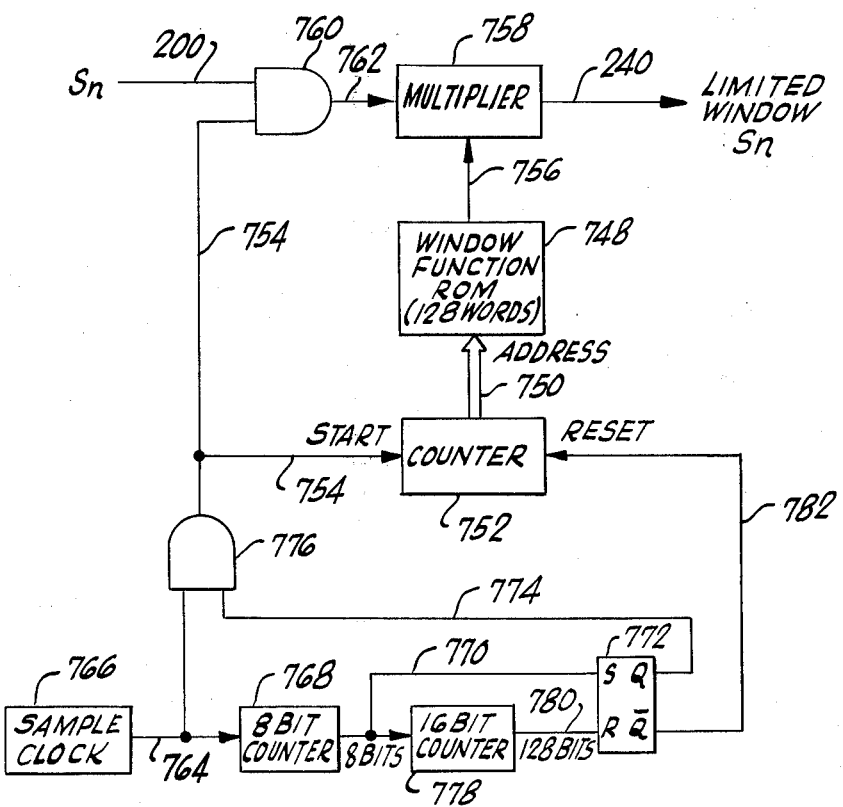
*Fig.20*

SPEECH ANALYSIS AND SYNTHESIS SYSTEM

BACKGROUND OF THE INVENTION

The present invention relates generally to speech analysis and synthesis systems and, more particularly, to systems designed to operate in real time for combining a plurality of telephone channels into a single telephone channel for further transmission and subsequent separation of the channels and synthesizing the speech waves from abbreviated speech data.

In the past, numerous techniques have been devised and proposed for analyzing the human voice and deriving abbreviated speech data for use later with a synthesizing device for generating human voice sounds from the speech data. A description of such techniques both historical and modern, may be found in Flanagan, "SPEECH ANALYSIS, SYNTHESIS AND PERCEPTION" (2nd. edition, New York, 1972, Springer-Verlag).

Typically, modern analysis techniques divide digital speech signals into time segments called "frames" of speech data and the speech is analyzed frame by frame. The time segments are too short to be perceptible to the human auditory system and are analyzed to produce a pitch period parameter representative of the vibratory rate of the vocal cords, or, a parameter which indicates no vibration (voiced/unvoiced decision parameter). A power parameter is also generated indicating the relative intensity of the speech signal. Finally, a plurality of coefficient parameters are generated which are generally representative of the filter coefficients of an electrical analog of the human vocal tract.

These control parameters are used in a subsequent speech synthesizer which also is an electrical analog of the human vocal cords and tract which produced the original speech sounds. The electrical output of the synthesizer is applied to a suitable transducer to produce the audible speech sounds.

Generally, known analysis and synthesis techniques produce intelligible imitations of the human voice, but normally the artificiality is noticable. Thus, speech analysis and synthesis techniques have not been used in telephone systems, for example, where it is desired that the speakers not be aware of the analysis synthesis process taking place. Furthermore, the speech signals were normally produced by relatively hifidelity microphones and the like which permitted the speech analysis to take place on speech signals having the full range of appropriate audio frequencies. Speech signals derived from telephone channels with relatively narrow audio pass bands could not be successfully analyzed due to the lack of basic speech frequencies needed for successful analysis. In addition, the computational time required to analyze speech signals was such that it was difficult to perform the analysis process in "real time" for even a single voice channel. Thus, the analysis synthesis was practically useable only for special transmission mediums with relatively wide band widths. Utilization of the analysis synthesis technique for a single channel telephone line offered no particular advantages except for the fact that the transmitted speech data was difficult to decode without knowing the analysis and synthesis process itself.

Thus, in the field of speech analysis and synthesis there has long been a need for processing techniques which would permit practical utilization of the analysis process in systems such as telephone circuits to take advantage of the abbreviated speech data to combine a number of telephone voice channels into a single comparable voice channel. The present invention satisfies that need.

SUMMARY OF THE INVENTION

The speech analysis and synthesis system of the present invention provides a plurality of novel signal processing techniques which permits the substantially parallel analysis and synthesis of a pluraltiy of voice channels with the speech data from the plurality of channels being time-division multiplexed for transmission through a single transmission media. In particular, a presently preferred embodiment of the system of the invention permits analyzing speech data from four telephone channels and transmitting the multiplexed speech data through a single telephone channel which is normally capable of transmitting sufficient information for only one speech channel. It should be noted, however, that, in addition to well known limitations due to bandwidth and coding techniques, the number of channels which may be processed is also presently limited by the processing speed of presently available hardware.

A plurality of digital signal processing techniques incorporated into the system of the invention sufficiently reduce the processing time for each channel so that four simultaneous speech channels may be analyzed and time-division multiplexed into a single channel, transmitted to a receiving de-multiplexer and the speech signals synthesized from the received speech data in "real time." The analysis techniques also generate speech data which is sufficiently accurate and representitive of the speech signals so that the synthesized speech signals are practically indistinguishable from the original speech signals. Thus, when utilized in telephonic communications systems, the speakers at either end of a particular circuit may be unaware of the intermediate analysis and synthesis process.

The plurality of specialized digital signal processing techniques represent both improvements in somewhat conventional analysis requirements and also entirely new analysis criteria. In particular, the system of the invention provides a single channel analyzer synthesizer combination in which the analyzer provides the control parameters of pitch period, a voiced/unvoiced decision parameter, linear prediction coefficient parameters and a power parameter which are used to control the synthesizer to generate pitch pulses or random noise in accordance with the pitch period parameter and voiced/unvoiced decision parameter. The pulses or noise are gain controlled by the power parameter and applied to a filter controlled by the coefficient parameters and the output is the reconstructed speech.

The basic single channel system may be expanded to handle a plurality of channels substantially in parallel by sequential time-division multiplexing the various signal processing steps of the complete system. The generated control parameters for each channel are multiplexed for transmission to the synthesizer where the processing is reversed to produce speech signals for the plurality of channels.

Among the improvements in the somewhat conventional analysis techniques is a system for conditioning a Cepstrum signal by applying an additive weighting signal to the Cepstrum signal to enhance the normally low amplitude peaks to facilitate their detection for the determination of pitch period. Another improvement is in the process for normalizing the digital speech signals which greatly reduces the signal processing time to perform the normalization calculations.

Similarly, in the calculation of the Cepstrum signal, a logarithm signal must be generated from a previous signal. In the present invention, the data signals are so conditioned and weighted that a linear signal approximation of the logarithm may be generated, at considerable savings in signal processing time, without appreciable error in the subsequent calculations.

In addition, the system of the invention contains some entirely new analysis procedures which greatly enhance the speed and accuracy of the signal processing to produce an integrated system capable of "real time" analysis and synthesis of a plurality of speech or data communications channels.

In particular, in the Cepstrum generation and analyzing procedure, it has been found that only alternate speech signal samples are needed to produce practically usable results and an interpolation procedure is performed at the end of the more complicated and time consuming calculations in order to improve the final accuracy of the generated pitch period control parameter.

In particular, the basic analysis of the Cepstrum signal produces, by determination of the time position of the highest pitch pulse, a basic pitch period. It is a feature of the present invention to interpolate a more accurate pitch period by an interpolation procedure using the amplitudes of the basic pitch period pulse and the immediately preceeding and following pulses and the basic pitch period. The result is a more accurate pitch period parameter.

Another feature of the present invention is generation of a more accurate voiced/unvoiced decision parameter by a sequential examination, in a definite priority, of a plurality of generated auxilliary signals based on the configuration of the Cepstrum signal and additional signals present in the system as the result of the analysis of the speech signals for other control parameters. The resultant voiced/unvoiced decision parameter is much more likely to be correct than when only one parameter is examined.

A further feature of the present invention is a technique for more practically relating system noise to such things as, for example, the voiced/unvoiced decision where a high noise level could result in an unvoiced decision when the speech signal is actually voiced. In the present system, the average noise is estimated from a consideration of the first auto-correlation coefficient parameters descriptive of the vocal tract described above. The first autocorrelation coefficient generally represents the average power in the speech signal at any given instant and the estimated noise is never allowed to rise above that signal but when the coefficient periodically rises during voiced speech segments, the estimated noise signal can only rise toward that coefficient at a predetermined rate. Thus, the estimated noise signal tends to follow the lowest values of the first auto-correlation coefficient during unvoiced speech segments. By relating the coefficent to the estimated noise signal, an indication can be gained as to whether the speech segment is voiced for that segment.

Another feature of the invention is the utilization of a reduced length of "limited" frame of speech data in the determination of the coefficient parameters. It has been found that the size reduction does not appreciably affect the accuracy of the generation of the coefficients and results in a further increased savings in processing time.

The size reduction is accomplished through the initial windowing needed for the speech data prior to calculation of the coefficients. The limited window has all of the prerequisite signal shaping capabilities but operates only over the center portion of the data frame.

A further feature of the system of the invention is a voice synthesizer excitation function which differs from the typically rectangular pulse applied to the synthesizer filter. The voice synthesizer excitation function is generally an amplitude increasing periodic waveform which, when applied to the synthesizer filter, produces a more natural sounding synthetic speech without the usual "buzzing" sound produced at low frequencies by more conventional synthesizers.

These and other features of the speech analysis and synthesis system of the present invention will become apparent from a consideration of the detailed description and drawings below.

BRIEF DESCRIPTION OF THE DRAWINGS

FIG. 1 is a block diagram of the analysis section of the speech analysis synthesis system of the invention;

FIG. 2 is a block diagram of the synthesis section of the invention;

FIG. 3 is a block diagram of a basic speech synthesizer;

FIG. 3b is a block diagram of a synthesizer for a single channel for the synthesizer portion of the system shown in FIG. 2;

FIG. 4 is a block diagram of the normalization calculation section of the synthesizer shown in FIG. 3;

FIG. 5 is a block diagram of the Cepstrum Weighting section of the analyzer shown in FIG. 3;

FIG. 6 is a wave-form diagram of a Cepstrum as modified by the Cepstrum Weighting section as shown in FIG. 5;

FIG. 7 is a simplified block diagram of a Cepstrum generator section of the analyzer shown in FIG. 3a;

FIG. 18 is a signal diagram of a sampled speech wave;

FIG. 19 is a signal diagram of the samples as passed by the limited window section of the analyzer of FIG. 3;

FIG. 20 is a hardware function block diagram of the limited window section of FIG. 3;

DESCRIPTION OF THE PREFERRED EMBODIMENT

CONTENTS

Figure 3A:
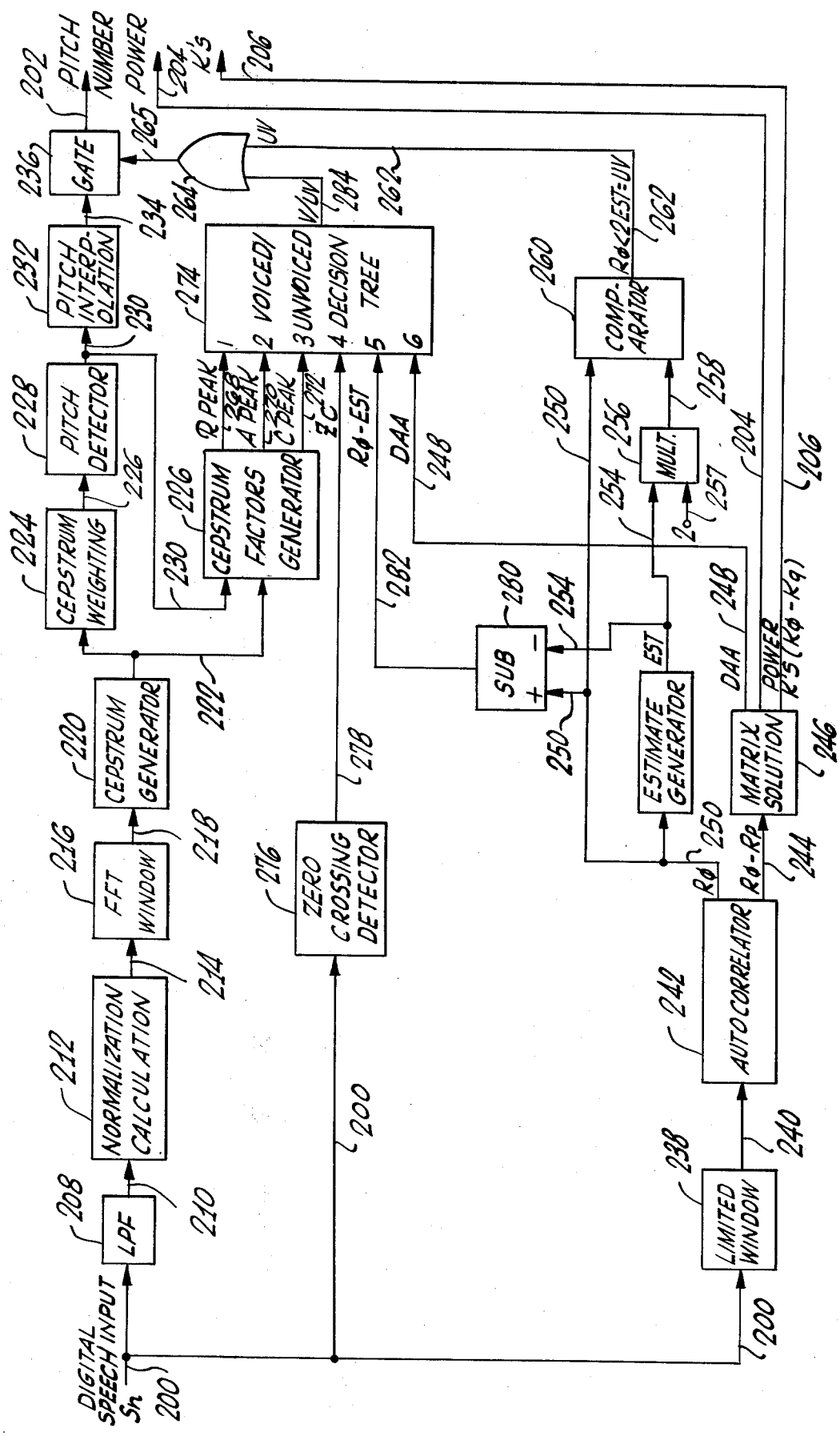
FIG. 3a is a block diagram of an analyzer for one channel of the analyzing portion of the invention shown in FIG. 1.

Introduction
Four Channel Analyzer-Synthesizer
Analyzer
Synthesizer
Normalization Calculation
Cepstrum Weighting
Linear Logarithm Technique
Pitch Interpolation
Pitch Detector - Pitch Doubling
Voiced/Unvoiced Decision
Variable Background Noise Estimate
Limited Window
Voice Synthesizer Excitation Function
Appendices
Claims

INTRODUCTION

The speech analysis and synthesis system of the present invention has for its basic purpose a reduction of data necessary to transmit speech electronically through a relatively limited bandwidth medium, such as a voice grade telephone line. The reduction is such that, for the described presently preferred embodiment of the invention, four separate speech channels may be transmitted through the single telephone channel which was originally designed for only one speech channel. The described analysis-synthesis process is sufficiently accurate so that there is substantially no noticeable degradation in the quality of any of the four received speech channels.

The analysis-synthesis system of the invention operates on the known principle that a speech waveform, whether oral or its electrical analog, is dependent on the vocal cords and the associated physical vocal tract which creates it. Thus, the basic speech analysis-synthesis technique is to assume an analyzable vocal tract with a predetermined number of control parameters and to determine, substantially by mathematical analysis, what the value of those control parameters are for prescribed length of speech time or a "frame time." The control parameters may then be transmitted in abbreviated form, as in the present invention, for example, to a synthesizer which is a mechanical or electrical analog of the vocal tract under the control of the selected parameters. The synthesizer substantially reproduces the original speech waveform. Before transmission, the parameters are subjected to data compression by a circuit which operates to examine each set of parameters, relating to each "frame time," and to eliminate redundancy or non-changing information from frame to frame.

In the course of development of speech analysis-synthesis techniques, a number of analysis methods have been proposed in an attempt to derive numerical coefficients which most accurately describe the configuration of the vocal tract generating a particular speech waveform. Almost universally, modern analysis techniques are based on an analysis of the speech waveform over a prescribed period of time, or a "frame time," and the analytical parameters for that frame are generated as a unit and are usually transmitted to a receiver and applied to a synthesizer. Normally, the frame time is too short for changes to be audibly detected at the output of the synthesizer and, for some systems, including the system of the present invention, the data change from frame to frame is restricted to prevent abrupt changes from frame to frame which may be audibly detectable.

The speech analysis and synthesis system of the present invention employs a linear prediction analysis method in which the representative parameters are pitch period, voiced/unvoiced decision, power and ten "K" coefficients descriptive of the analytical vocal tract which produced the speech. The speech signal to be analyzed in the presently preferred embodiment of the invention is of voice grade telephone channel quality which is of considerably restricted band width, approximately 300-3000 Hz. It should be appreciated that conventional analysis techniques have available as the speech signal the entire band width produced by an individual speaker while the speech signal available for analysis with the system of the present invention is severely restricted in band width and, for example, the basic pitch frequency typically may not be contained within the range of available frequencies so that pitch must be determined from an analysis of the harmonic frequency content present within the available band width.

FOUR CHANNEL ANALYZER-SYNTHESIZER

Turning now to the drawings, particularly FIGS. 1 and 2 thereof, the speech analysis and synthesis system of the present invention receives input speech signals from four input channels on lines 100-106 which are typically voice grade telephone lines. As the analysis-synthesis process is performed digitally, an analog to digital converter 108 operating substantially in parallel, by rapid time multiplexer operations on each channel, converts the analog signals on the input lines 100-106 to corresponding digital channel signal information. The digital channel information is fed through lines 110-16 to an analyzer 118 which performs the analysis of the four channel information, again substantially in parallel. The analysis process will be discussed in detail below.

The analyzer 118 produces the parameters discussed above which are fed through lines 120-126 to a compression circuit 128 which essentially analyzes the frame data of each channel on a frame to frame basis to eliminate redundant or non-changing information from frame to frame. The compression process is also performed substantially in parallel for each of the channels and the particular techniques employed are disclosed in copending application Ser. No. 596,832 entitled DATA COMPRESSION SYSTEM.

The compressed data output is fed through lines 130-136 to a four channel multiplexer 138 which time-division multiplexes the compressed channel data into a single serial data stream on a line 140 which feeds a MODEM 142 which produces a digital signal pattern suitable for transmission through a conventional voice grade telephone line. The digital signal on an output line 144 is fed into a digital-to-analog converter 146 which converts the digital signal into an actual analog signal which is then fed over an output line 148 to a conventional voice grade telephone line.

It should be appreciated that while the data for each channel is processed substantially in parallel the analog-to-digital converter 108, the analyzer 118 and the compression circuits 128 process the data for each channel sequentially to reduce the necessary circuitry to a minimum. While each channel data is processed sequentially, the various steps in the processing are intermediately performed for each channel so that, in essence, all channels are processed substantially in parallel as the data moves through the analysis system.

At the receiver, the process is reversed to produce four analog signals for further transmission through voice grade telephone lines. Thus, as illustrated in FIG. 2, an input from a voice grade telephone line on an input line 150 is fed to an analog-to-digital converter 152 which digitizes the signal which is then fed through a line 154 to a digital Modem 156 which recovers the time-division multiplexed digital channel parameter data. The digital data is fed through a line 158 to a demultiplexer 160 which separates the digital channel parameter data into four separate channels on lines 162–168 connected to a decompression circuit 170 which analyzes the parameter data on all four channels substantially in parallel to generate complete sequential parameter data for each channel which is then fed through lines 172 through 178 to a synthesizer 180.

Conventionally, for a single channel, the synthesizer 180 would take the form shown in FIG. 3 in which a pitch pulse generator 199a generates pitch pulses in accordance with the received pitch period parameter on line 199b. A random noise generator 199c produces a noise signal for use with unvoiced speech signals. The outputs of the pitch pulse generator 199a and random noise generator 199c are connected to respective pole terminals of a single pole-double throw switch 199d which is under the control of the voiced/unvoiced decision parameter to connect the output of the pitch pulse generator 199a to the remainder of the circuit if the decision is voiced or connect the output of the random noise generator 199d to the circuitry of the decision is unvoiced.

The output of the switch 199d is connected through a gain control 199e, under the control of the power parameter, to the input of a filter 199f whose characteristics are under the control of the coefficients connected to the filter through the lines 199g. The output of the filter 199f is connected through line 199h to the remainder of the circuitry.

The synthesizer 180 of the present invention synthesizes the original human vocal tract from the channel parameters on the lines 172–178 substantially in parallel to produce digital representations of the speech signals on lines 182–188. The digitized speech signals on lines 182–188 are fed to a digital-to-analog converter 190 which converts the signals to analog form substantially in parallel and produces an output on lines 192–198 suitable for further transmission to four separate voice grade telephone lines connected to conventional telephone sets (not shown), for example.

ANALYZER

As discussed above the analyzer 118 shown in FIG. 1 processes the digital signal data from the four channels substantially in parallel. However, the analysis process for each channel may be considered separately and FIG. 3a is a hardware function block diagram of an analyzer for a single channel. It should be appreciated that each step of the analysis for the single channel is also performed substantially in parallel by utilizing appropriate buffers and other intermediate storage devices which are well known and conventional in the art.

Thus, for a single channel, the digital speech input on a line 200 is analyzed to produce the pitch period, power and coefficient (K's) parameters on lines 202, 204 and 206 respectively. In the system of the present invention, the voiced/unvoiced decision parameter is represented by setting the pitch period parameter to zero. The analysis process is essentially three separate analysis steps. The first analysis step is to determine the pitch period of the digital speech input. The second analysis step is the determination of the coefficients (K's) of the analytical vocal tract which produced the digital speech input and the third analysis step is to determine whether the frame of digital speech input data is voiced or unvoiced which, as described above, determines whether a pitch frequency or random noise is applied to the filter 199f in the synthesizer shown in FIG. 3.

It should be appreciated that, while the digital speech input on line 200 is complete, each of the pitch period analysis and coefficient determination steps require only portions of that complete speech signal data. Therefore the speech signal data is modified as it proceeds through the various analysis steps.

In the first analysis technique, the determination of pitch period, the digital speech input is applied first to a conventional low pass filter 208 to eliminate extraneous high frequency components which are out of the analytical band. The low pass filter 208 is digital in nature and is conventionally constructed in accordance with well known techniques such as that discussed in "Digital Processing of Signals," Gold and Rader, McGraw-Hill, 1969 to produce alternate samples at its output on line 210.

The output of the low pass filter on line 210 is connected to a normalization calculation circuit 212 in order to normalize the amplitudes of the samples of digital speech data to a particular value upon which the further analysis is based. The normalized digital speech data on output line 214 is connected to a Fast Fourier Transform (FFT) window 216. The particular class of window is utilized because the Cesptrum calculation is a Fast Fourier Transform process and the FFT window 216 ensures maximum effectiveness of the Cepstrum calculation. The window data on line 218 is connected to a conventional Cepstrum generator 220 which performs the Cepstrum calculations, as discussed above.

While the Cepstrum calculation uses conventional sequential processing techniques, a feature of the system of the invention is that only alternate samples of the digital speech data are used in the Cepstrum calculation in order to decrease the processing time necessary to generate the Cepstrum. It has been found that any degradation in the generation of the Cepstrum is minimal and the accuracy of the subsequent pitch determination from the Cepstrum can be partially restored in a novel pitch interpolation technique which is described in detail below.

The Cepstrum data on output line 222 is utilized not only in the determination of pitch but in the latter determination of the voiced/unvoiced decision, as discussed below. When the Cepstrum data is utilized in determining the pitch number, the Cepstrum data is connected to a Cepstrum weighting section 224, described in detail below, which modifies the Cepstrum waveform in order to enhance the detection of the Cepstrum peak values needed to determine pitch. The weighted Cepstrum on output line 226 is connected to a pitch detector 228 which scans the weighted Cepstrum for peak values and checks the original peak determination for the "double pitch" phenomenon described in the literature. See Noll, "Cepstrum Pitch Determination," The Journal of the Acoustical Society of America, Vol. 44, No. 2, 1967, p.293.

The pitch or pitch number generated by the pitch detector 228 is then connected through a line 230 to a pitch interpolation section 232 which examines the pitch data and surrounding Cepstrum data to interpolate between sample values in the vicinity of the detected pitch period and, by a mathematical interpolation technique, generates a more accurate peak value and pitch period. Thus, the pitch interpolation section 232 partially restores the accuracy of the pitch period even though only alternate Cepstrum data samples were utilized, as discussed above.

The interpolated pitch period value on output line 234 is connected through a gate 236 to the output line 202 for the pitch period. When the voiced/unvoiced decision is voiced, the interpolated pitch period value on line 234 designated the pitch period on line 202. However, regardless of the calculated pitch period value on line 234, if the voiced/unvoiced decision is unvoiced, the pitch period on output line 202 is set to zero to indicate the unvoiced condition. Thus, the voiced/unvoiced decision determines whether the calculated pitch period value is to be utilized or not. It should be appreciated that the pitch determining calculation may result in the generation of a pitch number despite the fact that the other parameters of the digital speech data on line 200 indicate that the data represents unvoiced speech. Thus, the full analysis of the digital speech input determines the voiced/unvoiced decision and, if it is voiced, the output of the pitch interpolation section 232 is deemed to be correct pitch period value.

In the determination of the coefficients or K's the digital speech data on line 200 is subjected to a different analysis process. Thus, the data on line 200 is connected first to a novel limited window 238 which conditions the data for the calculation of the coefficients. The limited window 238 takes advantage of the empirically determined fact that, for the coefficient calculations, the digital speech data located at either end of the window can be effectively deleted, limiting the number of samples of the digital speech data needed for the calculations. Thus, as will be further discussed below, the limited window 238 provides a properly windowed abbreviated frame of data for the coefficient calculations. The truncated and windowed digital data on line 240 is then subjected to a conventional and well known linear prediction analysis and, therefore, is connected to a conventional autocorrelator 242 which generates intermediate autocorrelation coefficients on output line 244 further connected to a matrix solution section 246 which generates the K coefficients on line 206, a power term on line 204 and an error term (DAA) on a line 248 which is subsequently used in the voiced/unvoiced decision, as will be discussed below.

The autocorrelator 242 and matrix solution section 246 are constructed in accordance with conventional design techniques for a linear prediction solution such as discussed in Makhoulaad Wolf, "Linear Prediction and the Spectral Analysis of Speech," NTIS, AD-749066, Bolt, Beranek and Neuman, Inc., Cambridge, Mass., RBN Rep. 2304, Aug. 1972. See also U.S. Pat. Nos. 3,624,302 and 3,631,520. The error term DAA is a conventional output of the least mean squares analysis of the matrix solution and is well known though it may not be utilized in systems of the prior art.

The third analysis technique is making the voiced/unvoiced decision. In making the voiced/unvoiced decision, a plurality of factors are examined in a particular order of priority and, a superior factor decision is deemed determinative of the voiced/unvoiced decision. However, the examination of a factor may not result in a decision in which case the following factor is examined. Thus, if a particular factor determines that the digital speech input is representative of unvoiced speech, the remaining inferior factors are not considered. But, each of the factors are variable, and a voiced/unvoiced decision is dependent upon the factor falling outside of an "ambiguous range." If the factor value is within the ambiguous range the other factors are sequentially examined to determine whether or not they also fall within their individual ambiguous ranges. Normally, for any given frame of digital speech input data, the voiced/unvoiced decision can be made. But when all the factors are within their ambiguous ranges, the decision is to use the pitch number generated on line 234 as that appears to be the best use of all the analytical data.

Considering the factors examined in making the voiced/unvoiced decision, of primary concern is whether the overall signal represented by the digital speech data is sufficiently "organized" so as to have resulted from definite pitch pulses generated by the vocal cords. In the system of the invention, this organization is determined by comparing a parameter which is dependent upon organization of the signal with the average noise contained by the signal. If the dependent parameter is not sufficiently greater than the average noise level, the decision is immediately made that the digital speech data on line 200 must be unvoiced.

However, while the dependent parameter may be found in the analysis process, the average noise level in the signal is indeterminable. Therefore, in the system of the invention illustrated in FIG. 3, the dependent parameter which is used is the first autocorrelation coefficient ($R_\phi$) generated by the autocorrelator 242. The average estimated noise in the digital speech data is produced by an estimate generator 252. The average noise signal "EST" produced by the estimate generator on line 254 is compared with the first autocorrelation coefficient $R_\phi$ to determine whether the unvoiced decision may be made immediately. The operation of the estimate generator 252 is described in detail below.

In the system of the invention, it has been empirically determined that, unless the first autocorrelation coefficient $R_\phi$ is at least twice the estimated noise EST, it is most likely that the digital speech data is unvoiced. Therefore, the estimated noise signal EST on line 254 is multiplied by the constant 2 on line 257 by multiplier 256 and the doubled estimate signal on line 258 is compared with the first autocorrelation coefficient signal $R_\phi$ on line 250 by means of a comparator 260. The comparator 260 produces an output which is an unvoiced decision if $R_\phi$ is less then twice the estimated noise signal. The output on line 262 is connected to one input of an OR gate 264 the output of which on line 265 controls the gate 236 which either passes the interpolated pitch number on line 234 to the pitch number output line 202 or sets the pitch number on line 202 to zero if the unvoiced decision is made.

However, the fact that the first autocorrelation coefficient $R_\phi$ is greater than twice the estimated noise level is not determinative that the digital speech data is voiced. A further, more analytical decision is then made by examining the plurality of factors described above. The most important factors to be examined are those derived from an examination of the Cepstrum signal on line 222 as well as the detected pitch on line 230. Both signals are connected to the input of a Cepstrum factors generator 266 which produces three auxilliary signals which will be discussed in detail below. The "R peak," "A peak," and "C peak" signals on lines 268, 270 and 272, respectively, result from an examination of the sharpness of the peak of the Cepstrum and the further information contained in the Cepstrum waveform. The signals on lines 268, 270 and 272 are connected as inputs in a prescribed priority to a voiced/unvoiced decision tree 274. As will be described below, the voiced/unvoiced decision tree 274 essentially examines the signals on the lines 268-272 to determine whether they fall within accepted ranges. If any of the signals fall outside of a particular range, the decision is made that the digital speech data is voiced or unvoiced. If a particular factor signal falls within the prescribed range, the decision is indeterminate and the next factor signal is examined.

If it cannot be determined from the Cepstrum factors whether the digital speech data is voiced or unvoiced, the digital speech data on line 200 is examined by means of a zero-crossing detector 276 to determine how many times the signal crosses the zero axis. The number of zero-crossings as an output on line 278 is applied to the voiced/unvoiced decision tree 274 and, again, if the number of zero-crossings falls within a prescribed range, the voiced/unvoiced decision can be made. However, if not, a more direct comparison of the first autocorrelation coefficient $R_\phi$ and the estimated noise EST is made by means of direct subtraction in a subtractor 280 which produces a signal "$R_\phi$ - EST" on a line 282 connected to the voiced/unvoiced decision tree 274.

Again, if the decision is still indeterminate, an error signal DAA on line 248 from the matrix solution block 246 is examined to determine how random the digital speech input signal is. As noted above, the matrix solution 246 is essentially a least mean squares approximation and, if the approximation is reasonably close to a periodic signal, the error signal DAA will be low indicating a voiced decision however, if the digital speech data is substantially random, the error signal DAA on line 248 will be relatively high, indicating an unvoiced condition.

The voiced/unvoiced decision tree 274 produces an output on a line 284 only for an unvoiced decision which is connected as a second input to OR gate 264 which again, through output line 265 controls the gate 236. If a voiced decision from the voiced/unvoiced decision tree 274 is made, the output line 284 is automatically set to a no output condition. Thus, the unvoiced condition is indicated by an output on line 262 or 284.

SYNTHESIZER

The pitch period, power and K speech parameters on lines 202, 204 and 206 of the analyzer illustrated in FIG. 3 represent the digital control parameters for one frame of digital speech data for one channel of the complete system illustrated in FIG. 1. As described above, the frame parameters for each channel are analyzed further in a compression section 128 and thereafter time-division multiplexed and changed into a signal form suitable for transmission over a voice grade telephone line. On reception at the receiver illustrated in FIG. 2, the digital speech parameters are recovered and, one frame at a time, applied to a synthesizer 180 which operates on one channel at at time but which essentially synthesizes all four channels in parallel.

The synthesis process which occurs for each frame for each channel is illustrated in FIG. 3b. The recovered pitch period, power and K parameters are connected as inputs to the synthesizer on lines 286, 288 and 290, respectively. In order to reduce any abrupt changes in any of these parameters due to the normal sampling process or due to distortions or interference produced by the transmission process, particularly the normal fluctuating characteristics of the transmission media, the pitch period, power and K parameters on line 286, 288 and 290 are interpolated by means of a pitch interpolator 292, a power interpolator 294 and a K interpolator 296. The interpolators 292, 294 and 296 merely insure that there are no abrupt changes in any of these parameters which would introduce unnatural distortions in the synthesized speech.

The outputs of the pitch interpolator 292 and power interpolator 294 are connected through lines 298 and 300, respectively, to a pitch/noise generator 302 which produces at its output line 304 a digital signal representing pitch pulses at a particular frequency or, if the pitch number is zero, indicating unvoiced speech, a random noise generator is activated to produce random noise signals. The amplitude or level of the pitch pulses or random noise is controlled by the power signal on line 300.

The $K_\phi$ through $K_\phi$ parameters on an output line 306 of the K interpolator 296 are applied as control inputs to a lattice filter 308 which, in digital form simulates the physical vocal tract of the original human speaker. The pitch pulses or random noise on line 304 are applied to the lattice filter 308 are under the control of the K parameters, producing a digital speech signal on an output line 310 for one channel which is substantially a duplicate of the original speech input in digital form.

Again, referring to FIG. 2, the digital speech signals on lines 182-188 are applied to the digital to analog coverter 190 and the analog signals are applied to the four output channels which are themselves voice grade telephone lines to conventional telephone sets (not shown).

It should be appreciated that the pitch/noise generator 302 of the synthesizer shown in FIG. 3b is of novel form as will be discussed below and utilizes a novel pitch pulse technique which more closely approximates the waveform of the physical vocal cords, at least as communicated through a telephone line. Thus, the digital speech signal output on line 310 is a very close approximation of the original speech input. Indeed, the approximation or synthesis is sufficiently accurate that, within the band width confines of a telephone channel, the fact that the original speech has been electronically processed is substantially undetectable.

NORMALIZATION CALCULATION (FIG. 4)

Turning now to particular features of the analysis synthesis system of the present invention, as briefly discussed above, the determination of pitch includes preprocessing the digital speech input on line 200 of FIG. 3a to optimize the analysis process. Part of the preprocessing of the digital speech input is normalizing the particular digital speech input to a particular or maximum amplitude by means of a normalization block 212. The normalization calculation is effected by means of a technique illustrated in FIG. 4.

Due to the fact that the number system utilized in the hardware implementation of the presently preferred embodiment of the invention is signed fractional binary, or "sign-and-magnitude," the maximum numerical value for the purpose of normalization is set at 0.5 (decimal). It should be appreciated however, that any numeric value (M) which is equal to or less than 0.5 may be utilized in the normalization technique illustrated in FIG. 4.

The digital speech data on line 210 is generally considered to be a series of ordered samples which, for the purposes of the following discussion, may take the form illustrated in the sequence in Equation 1 below, $$S_{-n}, \cdots, S_{-2}, S_{-1}, S_\phi, S_{+1}, S_{+2}, \cdots, S_n \qquad \text{Eq. 1}$$

where the term $S_\phi$ is arbitrarily defined as the maximum numeric, or "peak" value. The digital speech sample data on line 210 is serially shifted into a sample register 312 until all of the samples are in the register. As the samples are shifted into the register 312, each sample is examined by a peak detector 314 which, through control line 316, enables the transfer of the peak amplitude value to a peak register 318. Thus, when all of the samples are in the register 312, the peak register 318 contains the sample $S_\phi$. The sample value in the peak register 318 is connected through a line 320 to one input of a comparator 322 which compares the peak value with a constant 0.5, used in the presently preferred embodiment connected on a line 324 to the second input of the comparator. If the peak value in the peak register 318 is less than 0.5, the comparator 322 activates a high speed shift clock 326 through a line 328. High speed shift clock pulses on an output line 330 of the high speed shift clock 326 are applied to the parallel shift input of the sample register 312 and to the parallel shift input of the peak register 318. All of the samples are simultaneously shifted at high speed toward greater values until the maximum value or peak sample in the peak register 318 is greater than 0.5. Assuming that N shifts are necessary to reach that value, the samples will be in the form of Equation 2, or:

$$2^N S_{-m}, \cdots 2^N S_{-1}, 2^N S_\phi, 2^N S_{+1}, 2^N S_{+2}, \cdots 2^N S_n \qquad \text{Eq. 2}$$

The then peak value $2^N S_\phi$ in the peak register 318 is connected through a line 320 to a reciprocal taking or divide block 332 which takes the reciprocal of $NS_\phi$ in the only divide operation necessary for the complete normalizaion calculation procedure. The reciprocal $\frac{1}{2}^N S_\phi$ on an output line 334 of the reciprocal taking block 332 is connected as an input to a multiplier 336 which has a second input on line 324 of the constant 0.5. The output of the multiplier on line 338 is therefore $0.5/2^N S_\phi$ which then becomes a constant factor which serves as one input to a second multiplier 340. Each sample in the sample register 312 is then serially shifted out on a line 342 to a second input to the multiplier 340 and each sample is multiplied by the constant factor $0.5/2^N S_\phi$. A serial output on a line 344 may be shifted into a buffer 346 for further outputing on line 214 to the window 216 shown in FIG. 3a. The output of the multiplier 340 on line 344 is the general form:

$$0.5 \frac{S_{-n}}{S_0}, \cdots, 0.5 \frac{S_{-2}}{S_0}, 0.5 \frac{S_{-1}}{S_0}, 0.5, 0.5 \frac{S_1}{S_0}, 0.5 \frac{S_2}{S_0}, \cdots 0.5 \frac{S_n}{S_0}$$

so that the peak value is 0.5 and the values of all the other samples are normalized to that peak value.

CEPSTRUM WEIGHTING (FIGS. 5 AND 6)

The output of the Cepstrum generator 220 of FIG. 3 is considered to be a conventional Cepstrum (See Noll, supra) having a main or primary peak followed by one or more secondary peaks along the time or $t$ axis. In analyzing the Cepstrum to determine pitch, the position of the primary and secondary peaks must be determined. Since increasing values of $t$ are affected by the window and low pass filter and reduced in amplitude, the Cepstrum signal is weighted in accordance with the present invention in the Cepstrum weighing section 224 which is illustrated in more detail in FIGS. 5 and 6. In FIG. 6, the Cepstrum signal waveform 347 is applied to a modified or skewed $t'$ axis 348 while a threshold voltage level 350 remains parallel to the convention $t$ axis 352. It can be seen that the primary peak 354 is well above the threshold level 350 and is immediately detectable. In general it will also be seen that a secondary peak 356 is above the threshold level because of the inclined $t'$ axis 348.

The technique for implementing the Cepstrum weighting process is illustrated by the hardware function block diagram shown in FIG. 5. The sequential digital Cepstrum samples are applied as an input on line 222 to a sample AND gate 360. The Cepstrum samples are then connected through line 362 to one input of an adder 364. The second input to the adder 364 on line 368 is a linearly increasing function generated in the following manner. An increment constant I which, for the presently preferred embodiment may be 1/512, is applied on a line 370 to one input of a second AND gate 372. It should be noted that the constant I on line 370 and the sequential Cepstrum samples on 358 are both simultaneously gated by means of an enabling line 374 generated by a sample clock 376 so that the Cepstrum sample and the constant are simultaneously applied to the remainder of the circuitry.

The constant I gated through AND gate 372 is applied through an output line 378 to one input of a second adder 380 which, together with a register 382 form a digital integrator. The output of the register 382 on line 368 is connected both to the Cepstrum adder 364 and as a second input to the second adder 380. The output of the adder 380 on line 384 is essentially the product of the constant I times the number of successive additions which have been performed for the number of sequential Cepstrum samples for a particular data frame. Thus, the output of the adder 364 on line 226 is the sum of the present Cepstrum sample and present value of the number of times the constant has been added to itself. Following the weighting of the Cepstrum samples for each frame, a conventionally generated frame clock signal on a reset line 286 is applied to the register 382 to reset the time-increasing Cepstrum weighting function.

LINEAR LOGARITHM TECHNIQUE (FIGS. 7, 8 AND 9)

Figure 7:
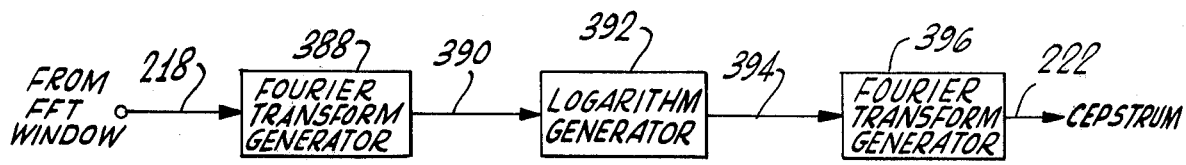

In the Cepstrum generator 320 shown in FIG. 3a, the conventional analysis sequence is illustrated in FIG. 7 in which the windowed digital speech data on line 218 is first applied to a Fourier Transform generator 388. The digital transform data on an output line 390 is then applied to a logarithm generator 392 which generates a logarithmic signal, to the base 2, which is further connected through line 394 to a second Fourier Transform generator 396, the output of which is the Cepstrum data on line 222.

Figure 8:
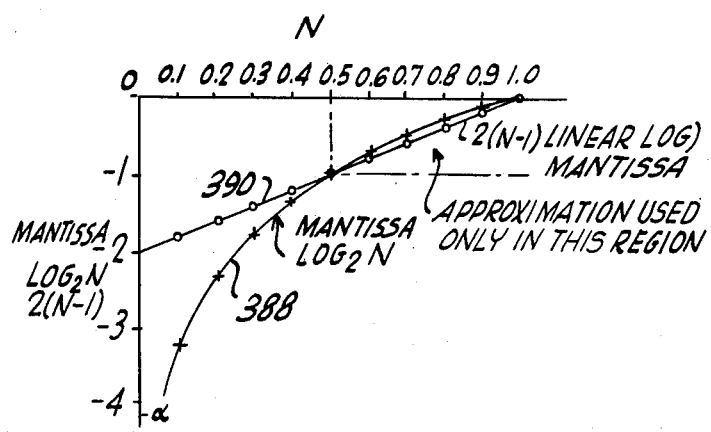
FIG. 8 is a graph illustrating the linear log approximation technique of the invention.

It has been empirically determined that the required precision of the taken logarithm is such that traditional table look-up or time-series techniques need not be used. Therefore, the logarithm to the base 2 of a particular number (N) is derived by means of a linear piece-wise approximation technique which is illustrated in FIG. 8. The output of the Fourier Transform generator 388 is shifted and constrained to be a number between 0.5 and 1.0. Over that range, a straight line defined by the equation, $$Log_2 N = 2(N-1)$$

approximates the actual mantissa of the logarithm of N between 0.5 and 1.0. In utilizing the approximation technique, any number N is shifted to the left a sufficient number of times so that the remaining new N is between 0.5 and 1.0. The number of shifts necessary to produce a new N within that range is the characteristic of the logarithm to the base 2.

Figure 9:
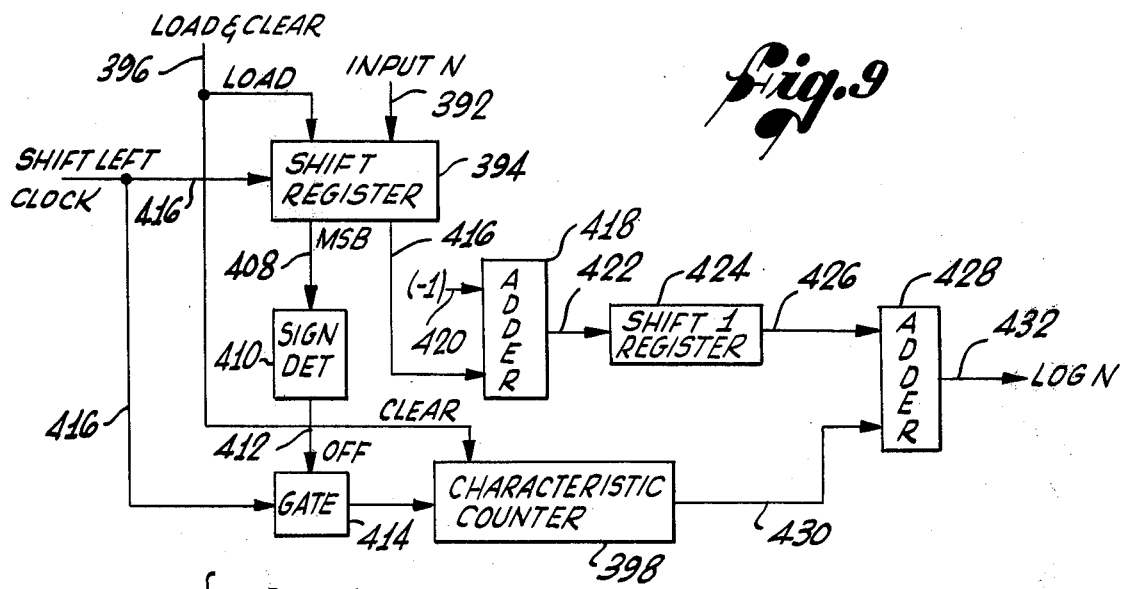
FIG. 9 is a block diagram of a method of implementing the linear log approximation technique.
Figure 10:
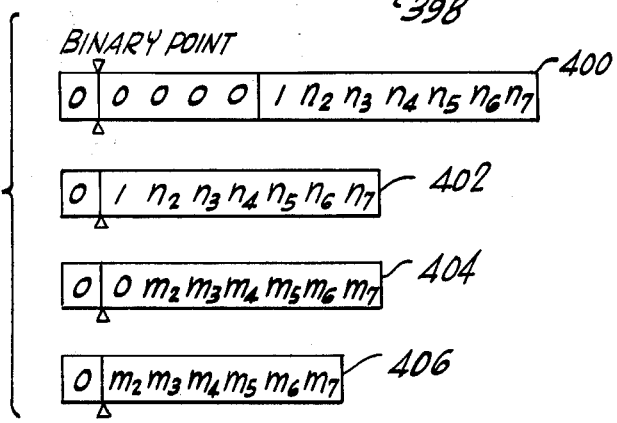
FIG. 10 is a graphical illustration of the data processing sequence for the linear log approximation technique.

The linear logarithm technique of the invention is implemented in accordance with the hardware function block diagram illustrated in FIG. 9. The number N on a input line 392 is loaded in parallel into a shift register 394 by means of a load and clear signal on line 396 connected to the load input of a conventional shift register and the clear input of a characteristic counter 398. The number N in the shift register then may appear as in the data diagram 400 shown in FIG. 10. The number is then shifted to the left until the absolute value of that number is greater than 0.5 which is determined by the position to the immediate right of the binary point being a "1" as illustrated by the data diagram 402 in FIG. 10. The one bit is detected by the most significant bit line 408 connected to a sign detector 410 which has an output line 412 which controls a gate 414. While the number N was being shifted to the left by means of a shift left clock signal on a control line 416, the shift clock pulses were transferred through gate 414 to a characteristic counter 398. Thus, the number of left shift clock pulses needed to shift the number to the format of the data diagram 402 shown in FIG. 10 is the characteristic of the logarithm. The shifted number in the shift register 394 is then gated in parallel through a line 416 to an adder 418 which has as a second input the constant "−1" on input line 420. The output of the adder on line 422 has the format of the data diagram 404 shown in FIG. 10.

The difference number on line 422 is shifted to the left by a shift one register 424 which effectively multiplies the number by 2 to produce a data diagram 406 shown in FIG. 10. The output of the shift one register 424 on line 426 is the mantisa of the logarithm to the base 2 and forms one input to an adder 428. The second added input on line 430 to the adder 428 is the characteristic of the logarithm stored in the characteristic counter 398. The output of the adder on line 432 is the sum of the characteristic and mantisa which is the logarithm to the base 2 of the number N according to the linear piecewise approximation technique of the invention.

PITCH INTERPOLATION (FIGS. 11 AND 12)

Figure 11:
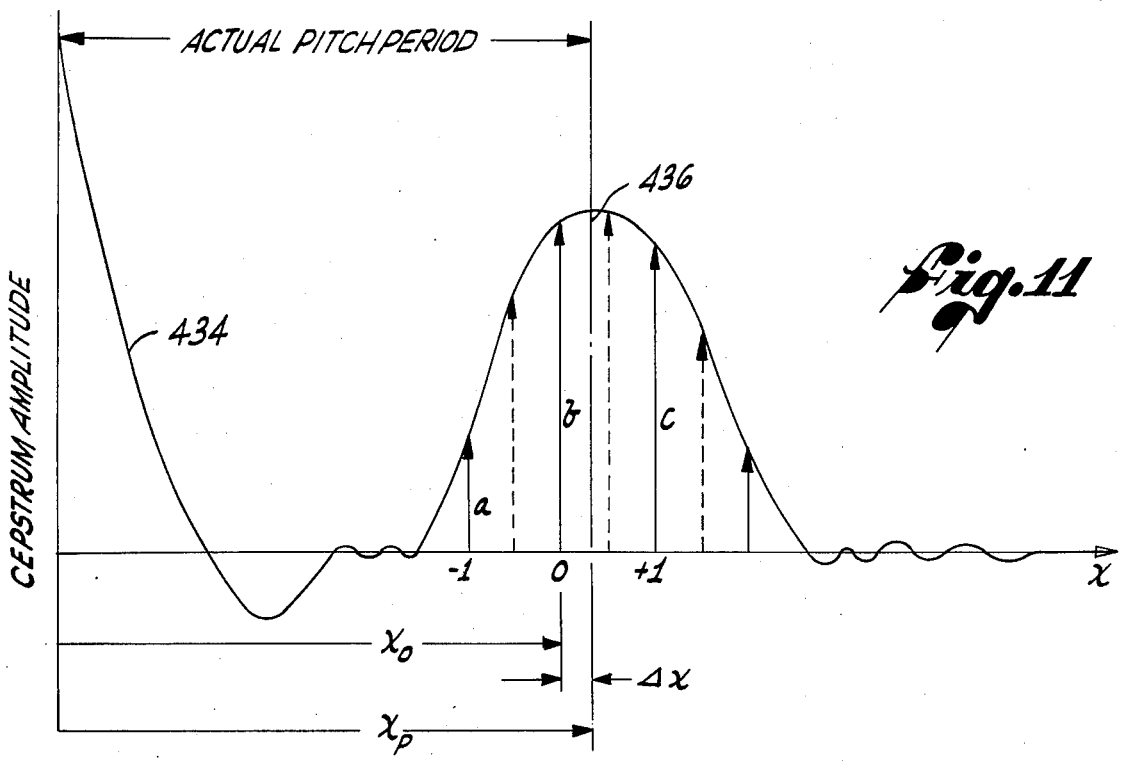
FIG. 11 is a wave-form signal diagram of a Cepstrum and related samples as used in the pitch interpolation section of the analyzer shown in FIG. 3.
Figure 12:
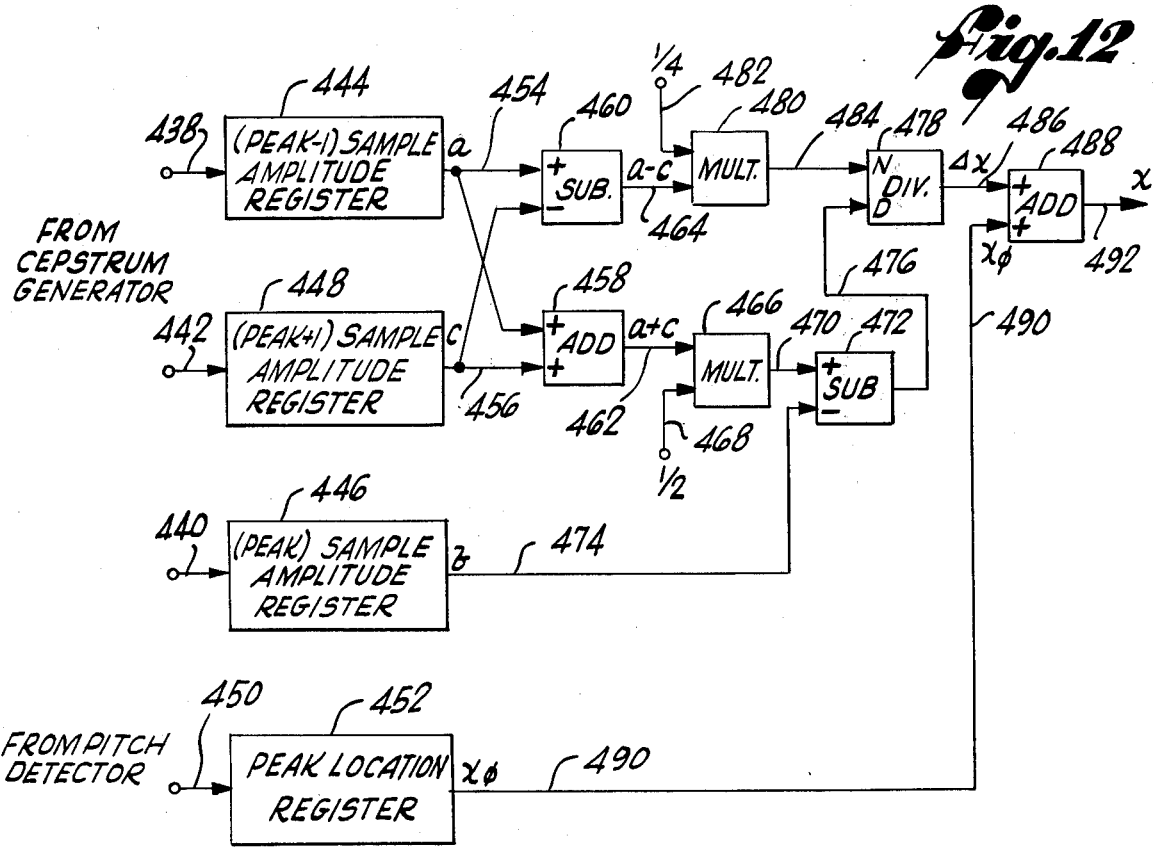
FIG. 12 is a hardware function block diagram of the pitch interpolation technique of the invention.

As was discussed above, the output of the pitch detector 228 in FIG. 3 is basically a number defining the position of a peak amplitude along the Cepstrum axis. Also, the pitch detection technique is based on utilizing only alternate samples of the Cepstrum to reduce processing time. While the pitch numbers generated are sufficiently accurate for many applications, in order to restore additional pitch accuracy, the pitch interpolation technique of the present invention is utilized to substantially examine the intermediate samples of the Cepstrum to determine if such an intermediate sample may more accurately represent the true pitch. The interpolation technique is illustrated in FIGS. 11 and 12 in which the Cepstrum signal outlined by the curve 434 is defind near the Cepstrum peak by the sample amplitude values $a$, $b$, and $c$ and their positions along the Cepstrum axis ($x$). The intermediate Cepstrum samples are shown in phantom and are not available for peak detection. From FIG. 11 it can be seen that the available sample $b$ has the greatest amplitude and would therefore be chosen by the pitch detector 228 (FIG. 3) with its corresponding position ($x_\phi$) as the pitch number. It can be seen however, that both available samples $b$ and $c$ are on either side of the true peak 436. Which has a position $x_p$ from the origin.

The present invention utilizes a substantially parabolic interpolation between the chosen peak $b$ and the sample values $a$ and $c$ on either side of the chosen sample. The interpolation technique is utilized to calculate the difference $\Delta x$ between $x_\phi$ the pitch number of the chosen peak sample $b$ and the true pitch number $x_p$. It can be shown that, $$x_p = x_\phi + \Delta x$$

and $$x_p = x_0 + \frac{a - c}{2(a + c - 2b)}$$

thus, from the position, $x_\phi$, of the detected pitch value and the amplitudes of the selected pitch value and the sample on either side of that selected value, the true pitch number $x_p$ can be interpolated.

The pitch interpolation technique is implemented by the hardware function block diagram shown in FIG. 12. From the Cepstrum generator the sample values $a$, $b$, and $c$ are inputed on lines 438, 440, and 442 respectively, and stored in respective $a$, $b$, and $c$ amplitude registers 444, 446 and 448. From the pitch detector 228 (FIG. 3) the pitch period $x_\phi$ is input on line 450 to a peak location register 452.

The $a$ and $c$ sample values on lines 454 and 456 respectively, are cross connected to an adder and subtractor 458 and 460, respectively, to form the sum and the difference of $a$ and $c$ on lines 462 and 464 respectively. The sum on line 462 is connected to one input of a multiplier 466 and the other input to the multiplier on line 468 is the constant ½. The product on line 470 is connected to the plus input of a subtractor 472 and the $b$ sample value on line 474 is connected to the minus input of the subtractor. The output of the subtractor 472 on line 476 is connected to the divisor input of a divider 478.

The difference between $a$ and $c$ on line 464 is connected to a first input of a multiplier 480 and the second input on line 482 is a constant ¼. The output of multiplier 480 is connected by a line 484 to the numerator input of the divider 478. The output of divider 478 on line 486 is $\Delta x$ and is connected to one input of an adder 488, and the second input to the adder on line 490 is the value $x_\phi$. The output of adder 488 is the $x_p$ value on line 492 which is the interpolated pitch period.

PITCH DETECTOR - PITCH DOUBLING (FIG. 13)

In analyzing a Cepstrum for a pitch period, occasionally the highest peak will occur at double the correct pitch period. This phenomenon is believed to be principally due to rapidly changing pitch period which results in secondary peaks in the Cepstrum signal which grow in amplitude until the primary peak is obscured. (Noll, supra).

In order to determine whether a doubled pitch period has been chosen, the Cepstrum signal in the vicinity of half the selected pitch period peak is examined to determine whether its amplitude is above a predetermined threshold level. The threshold level in the case of the presently preferred embodiment is empirically predetermined to be one half of the amplitude of the originally selected pitch period. If the half-period peak amplitude is equal to or above the predetermined threshold level, the halved pitch period and amplitude is designated as the true pitch and amplitude.

Figure 13:
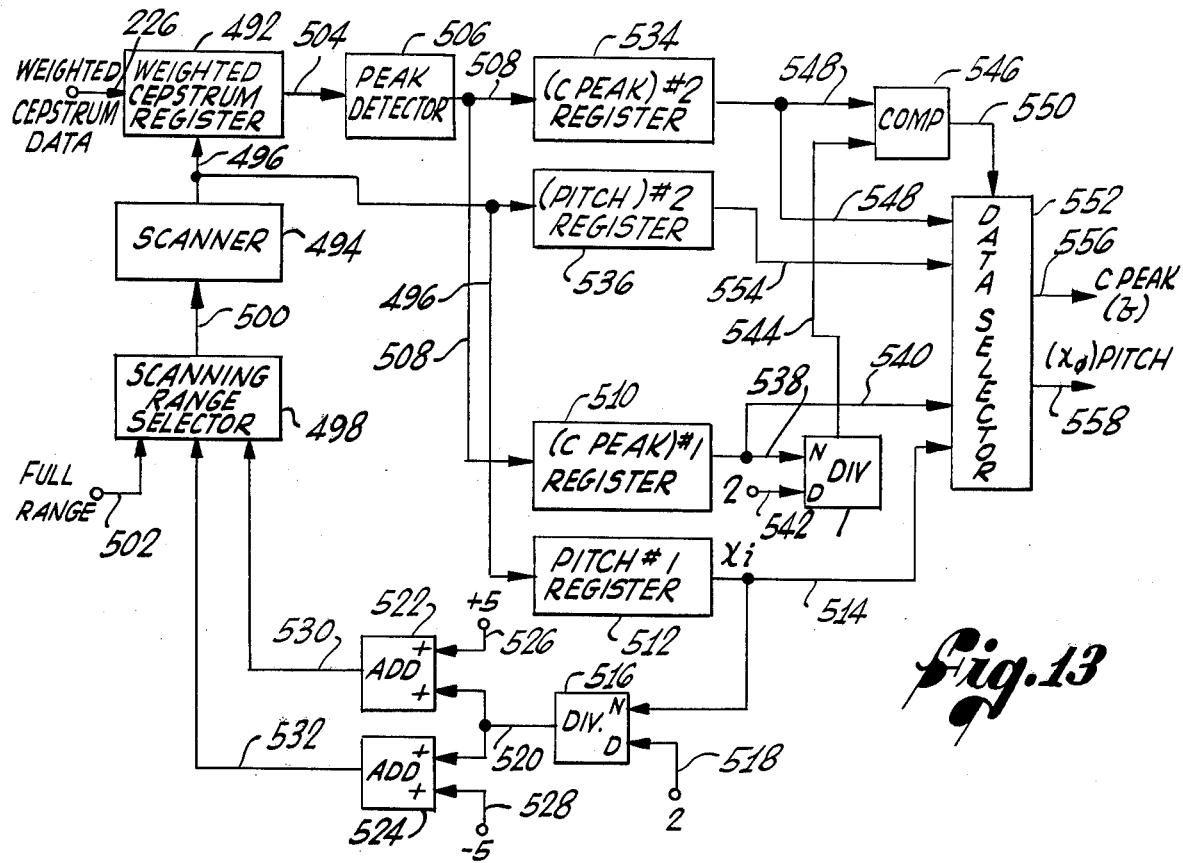
FIG. 13 is a hardware function block diagram of the pitch detector section of the analyzer shown in FIG. 3.

The half-period test is implemented by the hardware function block diagram shown in FIG. 13. The weighted Cepstrum data on line 226 is serially entered into a weighted Cepstrum register 492 and the entire Cepstrum is scanned by a scanner 494 which generates scanning control signals on a line 496 connected to the weighted Cepstrum register 492. The range of the scanner 492 is under the control of a scanning range selector 498 which generates control signals on a line 500 connected to the scanner 494. Scanning range selector is under the control of a number of control inputs, one of which is a full range signal on a line 502. As the complete Cepstrum in the register 492 is scanned, the Cepstrum samples on an output line 504 are applied to a peak detector 506 which picks the maximum amplitude Cepstrum sample and applies it to a line 508 to a Cepstrum peak #1 register 510. When the Cepstrum peak is entered into register 510, the sample number on line 496 from the scanner 494 is entered into a pitch period #1 register 512. Thus, at the end of the first scan, the Cepstrum peak #1 register 510 and the pitch period #1 register 512 contain the amplitude and the pitch period of the maximum amplitude peak of the Cepstrum.

To test for pitch doubling, the pitch period in register 512 on a line 514 is applied to the numerator input of a divider 516 and a constant 2 is applied through line 518 to the denominator input of the divider. The output of the divider on line 520 is half the first pitch period and is applied as first inputs to a pair of adders 522 and 524. The other inputs to the adders are a constant + 5 on line 526 and a constant − 5 on line 528. The outputs of adders 522 and 524 thus define a pitch period scanning range on lines 530 and 532 which is a + or − 5 samples about a center point of half the first pitch period.

The scanning range inputs on lines 530 and 532 are connected to the scanning range selector 498 and by means of the scanner 494, the Cepstrum samples in that range are again scanned for another peak. If a peak is detected by the peak detector 506 and stored in a Cepstrum peak #2 register 534 simultaneously, the sample number of the second peak is applied through line 496 to a pitch period #2 register 536. Thus, following the second scan, the first and second Cepstrum peaks in registers 510 and 534 as well as their corresponding pitch period in registers 512 and 536 are available.

To determine whether the threshold conditions for the second peak has been satisifed, the Cepstrum peak in register 510 is connected through line 538 to the numerator input of a divider 540. The constant 2 is applied through line 542 to the denominator input divider 540 and the quotient is applied through line 544 to one input of a comparator 546. The Cepstrum peak #2 in register 534 is applied through a line 548 to the second input of the comparator and a control output from the comparator on line 550 is connected to a data selector 552 and, depending on the output on line 550, either the first Cepstrum peak and period on lines 540 and 514 or the second peak and period on lines 548 and 554 are selected as the Cepstrum peak output and pitch period output on lines 556 and 558 respectively.

VOICED/UNVOICED DECISION (FIGS. 14 AND 15)

As discussed above, while the analysis process may produce a pitch period, the nature of the digital speech data may be such that an overall analysis indicates that an unvoiced determination may be more correct. Thus, as discussed above, in ambiguous cases a plurality of auxilliary factors are examined in a predetermined sequence with a predetermined priority. The more important of these factors are derived from a further analysis of the Cepstrum waveform, in particular, how well defined that peak is in relation to the signal waveform on either side of it.

For the presently preferred embodiment, a typical Cepstrum peak is assumed to occupy approximately six sample positions. The signal waveform for a short distance on either side of the assumed peak range is therefore examined to determine information, or power, content and the characteristics of the peak within those ranges. The information content is determined by summing the absolute values of the samples within the two auxilliary ranges and the total divided by the Cepstrum peak to obtain a numerical value (A peak) related to relative information content.

To determine the relative amplitude of any peaks within the auxilliary ranges, a peak detector selects the sample with the maximum amplitude within the auxilliary ranges and again, that value is divided by the Cepstrum peak value to develop a relative range peak (R peak) signal.

The average information content signal, A peak, varies from a value of zero to a value of one with a larger number indicating a voiced decision. This is because the absolute values are added and a larger number indicates a significant amount of excursions above and below the zero axis of the Cepstrum before and after the chosen Cepstrum peak which is indicative of a clearly defined Cepstrum peak. The range peak signal will vary from a zero value to a maximum of one with the larger the number being indicative of an unvoiced signal due to the fact that there is an auxilliary peak near the chosen pitch peak value which is of relatively high amplitude indicating that the chosen pitch peak is not clearly defined.

Figure 14:
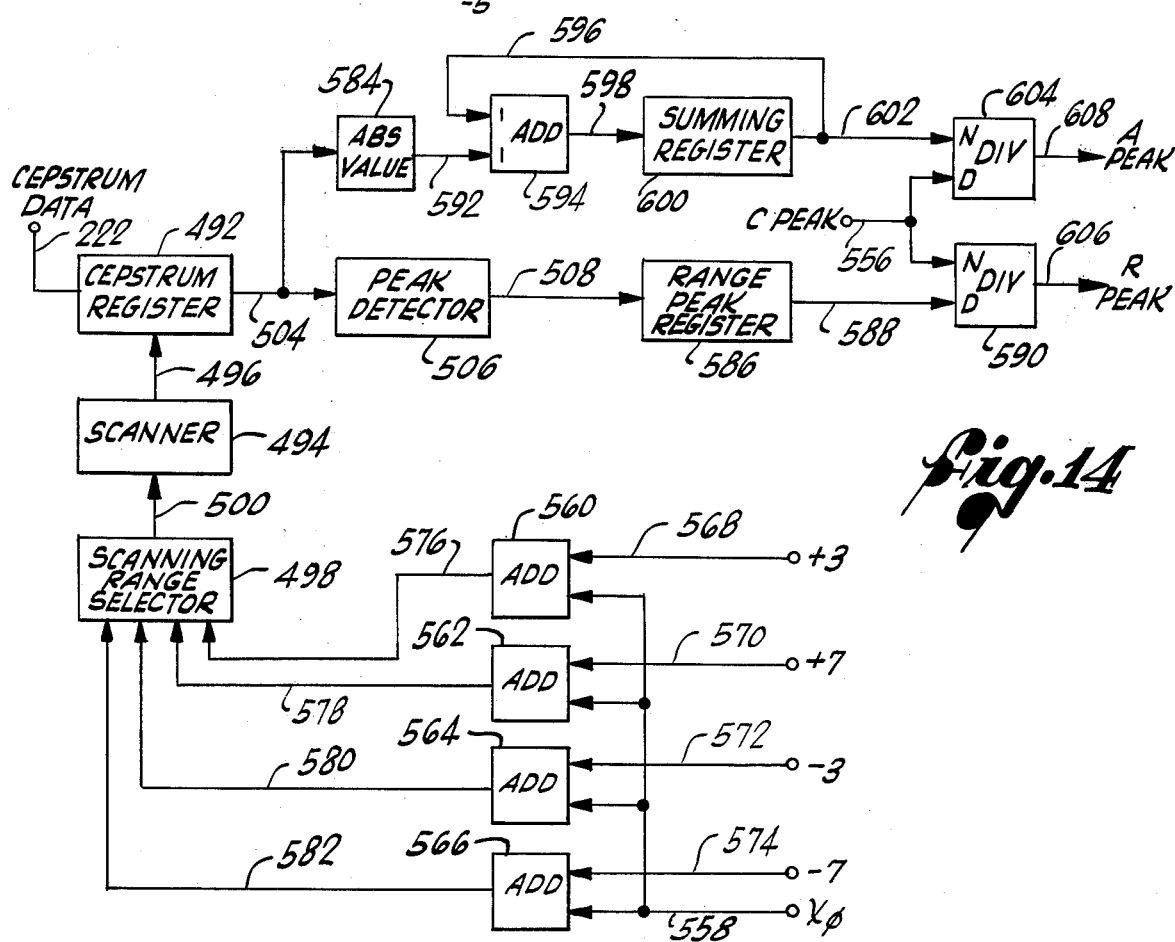
FIG. 14 is a hardware function block diagram of the Cepstrum factors generator section of the analyzer of FIG. 3.

The two auxilliary signals A peak and the R peak are derived by means of the hardware function block diagram illustrated in FIG. 14. Again, the Cepstrum register 492, scanner 494 and scanning range selector 498 are employed and the Cepstrum data (un-weighted) on line 222 is entered into the register 492. From the previously discussed peak detector 228, the pitch period $x_\phi$ on line 558 is entered as a first input to four adders 560, 562, 564 and 566. Constants of +3, +7, −3 and −7 are connected through lines 568, 570, 572 and 574 respectively to adders 560, 562, 564 and 566.

The range select outputs on lines 576, 578, 580 and 582, respectively, are connected as inputs to the scanning range selector 498 which, by controlling the scanner 494, samples the Cepstrum within two ranges on either side of the previously selected pitch period. The output of the scanned Cepstrum register 492 on line 504 is connected to an absolute value circuit 584 and also to the peak detector 506. The output of peak detector 506 on line 508 is connected to range peak register 586 and, following the scan, the peak value in range peak register is connected through a line 588 to the denominator input of a divider 590.

The absolute value of each Cepstrum sample within the auxiliary ranges is connected through a line 592 to one input of an adder 594. The second input to adder 594 on line 596 is the sum of the absolute values of the previous samples. The previous sum plus each new absolute value are added and connected through a line 598 to a summing register 600 in which the total sum is eventually formed. The total sum of the absolute values of the samples is connected through a line 602 to the numerator input of a divider 604. The Cepstrum peak signal (C peak) on line 556 is connected to the numerator and denominator inputs of dividers 590 and 604, respectively, and the quotients form the R peak and A peak signals on lines 606 and 608 respectively.

Figure 15:
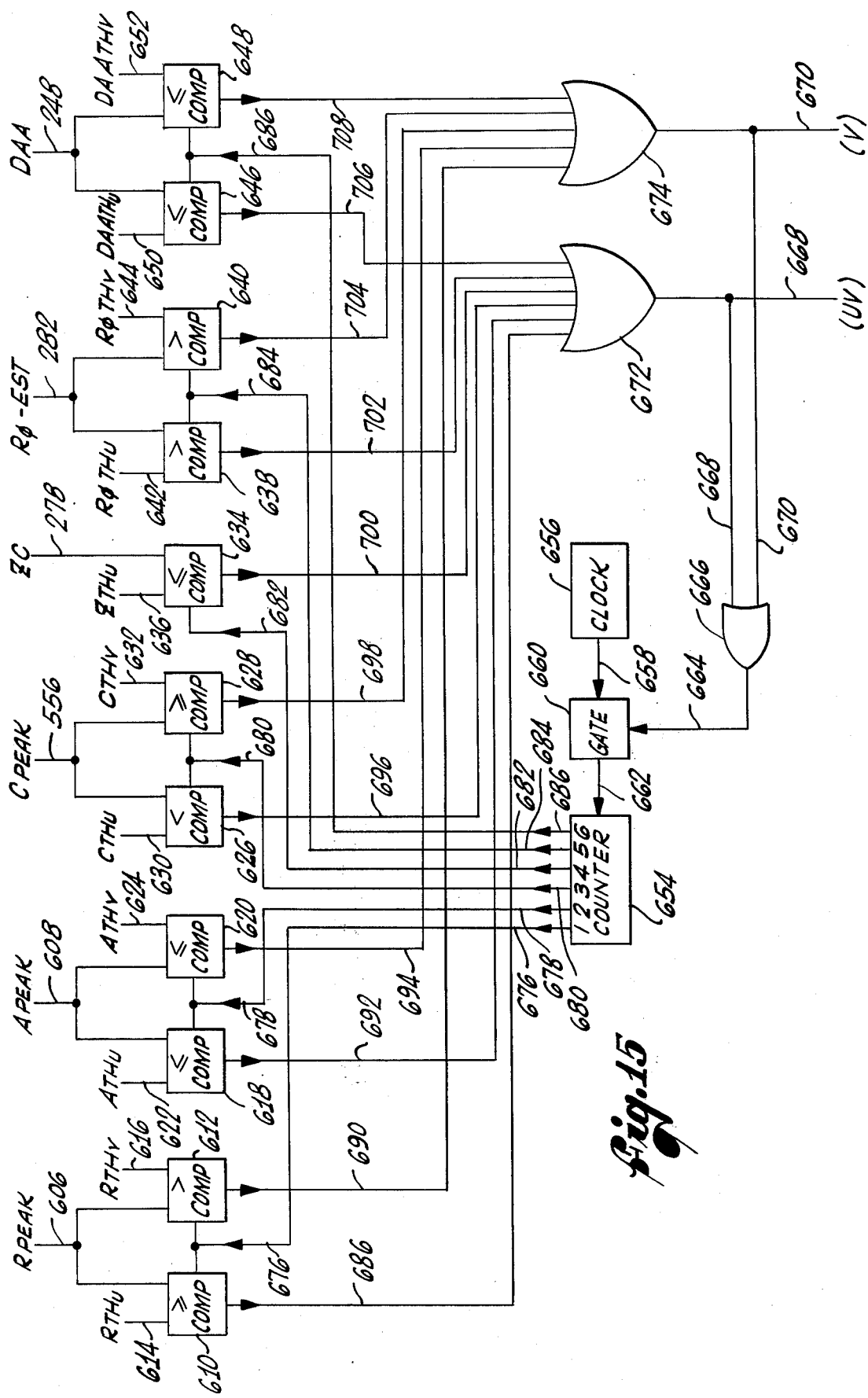
FIG. 15 is a hardware function block diagram of the voiced/unvoiced decision section of the analyzer of FIG. 3.

When the auxilliary signals from the pitch detector 228, the Cepstrum factors generator 266, the first autocorrelation coefficient on line 250 as well as the estimate signal (EST) on line 254 and the error signal DAA on line 248 are available, the voiced/unvoiced decision tree 274 (FIGS. 3 and 15) may be used to determine whether the digital speech data is voiced or unvoiced in ambiguous cases. Typically the Cepstrum peak will be so much greater than the range peak (R peak) signal that the decision may be made quickly for voiced speech data. However, for whispered or unusual inflections in speech, the voiced/unvoiced decision may not be as readily made. Therefore, the auxilliary factors are connected to a voiced-unvoiced decision tree 274, the implementation of which is illustrated in the hardware function block diagram of FIG. 15.

In this implementation, the R peak signal on line 606, the A peak signal on line 608, the C peak signal on line 556, the zero crossing signal on line 278, the $R_\phi$-EST signal on line 282 and the DAA error signal on line 248 serve as inputs to a plurality of comparators which, together with appropriate comparing threshold signals, define the ranges for those signals which produce either a voiced, an unvoiced or an undecided decision. Each input signal is sequentially examined in a predetermined priority with three possible outputs for each input signal.

Thus, the R peak signal on line 606 is connected to first inputs of a pair of comparators 610 and 612 which have as second inputs constants set at predetermined unvoiced and voiced thresholds on lines 614 and 616, respectively. Similarly, the A peak signal on line 608 is connected to first inputs of another pair of comparators 618 and 620 which have as second inputs threshold constants for unvoiced and voiced thresholds on lines 622 and 624, respectively. The C peak signal on line 556 is connected as first inputs to two comparators 626 and 628 which have as their second inputs unvoiced and voiced constants connected to second inputs on lines 630 and 632, respectively. The zero-crossing number on line 278 is connected as the first input to a single comparator 634 which has a second input a unvoiced threshold constant on line 636. The $R_\phi$-EST signal on line 282 is connected as first inputs to a pair of comparators 638 and 640 which have their second inputs unvoiced and voiced threshold constants on lines 642 and 644, respectively. The error signal DAA on line 248 is connected as first inputs to a pair of comparators 646 and 648 which have as their second inputs unvoiced and voiced thresholds constants on lines 650 and 652, respectively.

The comparator networks for the input signals are activated by means of enabling signals sequentially generated by a counter 654 which is driven by a clock 656 which supplies clock pulses through a line 658 to a gate 660 which, if enabled, permits the pulses to enter the counter through a line 662. The gate 660 is controlled through a line 664 from the output of an OR gate 666. The input line 668 and 670 to the OR gate 666 are derived from the outputs of multiple input voiced or unvoiced OR gates 672 and 674. The gate 660 permits clock pulses to enter the counter 654 which will produce enabling signals for the comparators only if a particular comparison results in an indeterminate decision. If a voiced or unvoiced decision is made at any comparison, the decision on lines 668 or 670, respectively, disables the gate 660, preventing further comparisons.

The counter produces sequential enabling outputs on 6 different lines 676, 678, 680, 682, 684, and 686. The enabling signals on the lines 676–686 are connected to enabling inputs of the various comparator combinations, with the output lines of the comparators being connected to alternate inputs of the voiced or unvoiced OR gates 672 and 674. Thus, the R peak comparators 610 and 612 have unvoiced and voiced decision outputs 688 and 690, respectively, the A peak signal comparator 618 and 620 have unvoiced and voiced decision outputs 692 and 694, respectively, the Cepstrum peak signal comparators 626 and 628 have unvoiced and voiced decision outputs on lines 696 and 698, respectively, the zero-crossing signal comparator 634 has an unvoiced decision output line 700, the $R_\phi$-EST signal comparators 638 and 640 have unvoiced and voiced decision output lines 702 and 704, respectively, and the error DAA input comparators 646 and 648 have unvoiced and voiced decision lines 706 and 708, respectively. The unvoiced decision lines are all connected to the unvoiced OR gate 672 while the voiced decision lines are connected as inputs to the voiced OR gate 674.

VARIABLE BACKGROUND NOISE ESTIMATE (FIGS. 16 AND 17)

As discussed above with reference to the voiced/unvoiced decision, a criteria in determining whether a speech data signal should be represented as voiced or unvoiced speech is whether the energy of the signal is above a certain noise level. While the total energy of the signal is generally accepted to be adequately represented by the magnitude of the first autocorrelation coefficient $R_\phi$, the average noise level of the speech data signal is difficult to evaluate by measurement.

Thus, it is a feature of the system of the present invention to estimate the average noise level so that a comparison of the autocorrelation coefficient $R_\phi$ can be made for the voiced/unvoiced decisions discussed above. The noise estimation technique is partially based upon the fact that the autocorrelation coefficient $R_\phi$ varies relatively regularly because there are clearly defined intervals of voiced speech followed by unvoiced speech. During the unvoiced periods, the $R_\phi$ term is normally quite low and used to establish a base level for the estimated noise level in the particular channel for that time. When a voiced interval returns, the $R_\phi$ term will normally be well above the noise level, which is hereinafter called the estimated noise signal (EST).

Figure 16:
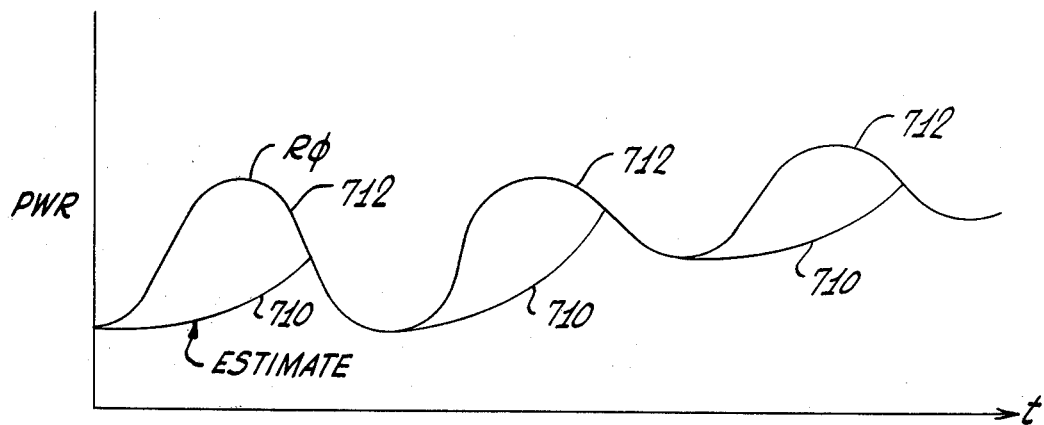
FIG. 16 is a signal diagram of the variation of the power term ($R_\phi$) and its relationship into the generated estimated noise term (EST)

While it is assumed that during unvoiced segments of speech, the noise level cannot be greater than the coefficient $R_\phi$, it is also assumed that the noise level will gradually increase during voiced speech segments. Therefore, as illusrated in FIG. 16, the estimated noise signal 710 can never be greater than the $R_\phi$ coefficient 712 but the $R_\phi$ coefficient can increase at a much greater rate than is permitted for the estimate signal (EST) 710. Therefore, as the $R_\phi$ term decreases toward an unvoiced speech segment, the noise estimate signal (EST) 710 will maintain the same value as the $R_\phi$ coefficient. However, as the $R_\phi$ coefficient increases during a voiced speech segment, the estimate signal is permitted to increase only at a slow exponential rate. However, from a consideration of FIG. 16, it can be seen that as the actual average noise level increases, the $R_\phi$ term increases during unvoiced speech segments and the base starting level for the estimate noise signal (EST) 710 gradually can increase.

Figure 17:
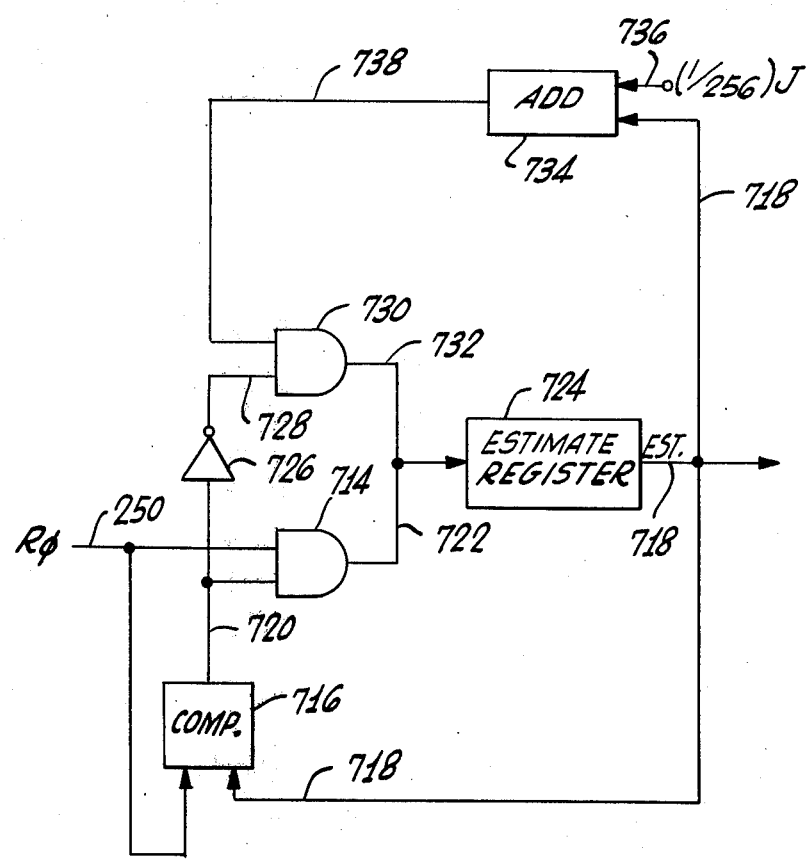
FIG. 17 is a hardware function block diagram of the estimate generator section of the analyzer of FIG. 3 with a companion test for an initial voiced/unvoiced decision.

A functional hardware block diagram of the estimate generator 252 shown in FIG. 3 is illustrated in FIG. 17. The first autocorrelation coefficient $R_\phi$ on line 250 is connected both as an input to a first AND gate 714 and as a first input to a comparator 716. A second input to the comparator 716 on a line 718 is the present estimate signal EST which is compared with the $R\phi$ coefficient. If the $R\phi$ coefficient is less than the estimate signal on line 17 the comparator generates an output on a line 270 which enables the AND gate 714 to connect the $R\phi$ coefficient on line 250 through an output line 722 to the input to an estimate register 724. The enabling signal from the comparator 716 on line 720 is also connected through an inverter 726 which generates a disabling signal on a line 728 for an AND gate 730 which has an output on a line 732, also connected as an input to the estimate register 724.

The AND gate 730 connects the present output of the estimate register on line 718 as a first input to an adder 734 which adds a constant J (1/256) on a second input 736 to the adder to produce an output on a line 738 which serves as the signal input to the AND gate 730. Thus, assuming conventional clocking techniques, the constant J (1/256) is sequentially added to the signal in the estimate register for each clock time if the $R_\phi$ term is equal to or greater than the present output of the estimate register 724 on line 718. If the $R_\phi$ coefficient on line 250 should become less than the present output of the estimate register 724 on line 718, sequential addition is disabled and the present value of the $R_\phi$ coefficient is inserted into the estimate register. Therefore, the output of the estimate register on the line 718 will be the $R_\phi$ coefficient until that $R_\phi$ coefficient begins to increase again. Depending upon the value of the constant J, which in this case is (1/256), the present output of the estimate can be made to attempt to follow the $R_\phi$ coefficient at any desired rate.

LIMITED WINDOW (FIGS. 19 AND 20)

As discussed above with respect to the analyzer shown in FIG. 3, in evaluating the coefficients $K_\phi$ through $K_9$, it has been found that not all of the samples of the digital speech data input on line 200 are needed. Therefore, the window 238, which conditions the speech samples so that the autocorrelator for 242 can more speedily and efficiently operate, reduces the number of samples which are available. The reduction technique or the limiting technique is illustrated in FIGS. 18-20. FIG. 18 shows a diagrammatic sample speech wave 740 which, for the purposes of illustration will be assumed to include 144 samples. Normally, all 144 samples would be passed through a window. However, the number of samples that are permitted to pass through the limited window is 128. This is accomplished, as illustrated in FIG. 19, by truncating the number of samples at the beginning and the end of the complete data frame with a window signal 742 which otherwise has the correct shape to produce the proper autocorrelation calculations. Therefore, the sample space at the beginning 744 and end 746 of the complete sample space is available for other computations.

Thus, in the system of the present invention the window function includes a reduced number of samples which can generate acceptable data but the window is not simply truncated. The limited window function is a complete function which, in the present case, is a Hamming window which operates only over a limited number of samples in the middle of the data frame.

A hardware function block diagram for implementing the above described limited window technique is shown in FIG. 20. Conventionally, a window function is generated by a read only memory (ROM) 748 in response to sequentially addressing the ROM through an address bus 750. The address on the bus 750 is generated by means of a counter 752 which is started by a control signal on a start line 754 at the beginning of the data frame. The window function generated by the ROM 748 is applied through a line 756 as an input to a multiplier 758. The other input to the multiplier 758 is the digital speech data samples on line 200 which are applied as an input to an AND gate 760. The output of the AND gate on line 762 is applied to the second input of multiplier 758. The speech data samples, multiplied by the window function, form the output of the multiplier on line 240.

In order to provide a sample time delay for the window function to be generated by the ROM 748, clock pulses on a line 764 from a sample clock 766 are applied first to an 8 bit counter 768, for the present invention, which produces an output on the line 770 which sets an RS flip-flop 772. The Q output of the flip-flop 772 on line 774 then enables an AND gate 776 which permits the sample clock pulses on line 764 to pass through the AND gate to the start line 754 for the counter 752 and enables the AND gate permitting the speech data samples on line 200 to reach the multiplier 758. The output of the 8 bit counter 768 on line 770 is also applied as an input to a 16 bit counter 778 which at the end of 128 sample pulses on line 764 produces an output on line 780 which resets the RS flip-flop 772. The change of state of the flip-flop 772 then disables the AND gate 776 and the Q output of the flip-flop is applied through a line 782 to a reset input of the counter 752.

VOICE SYNTHESIZER EXCITATION FUNCTION (FIGS. 21 THROUGH 24)

Figure 21:
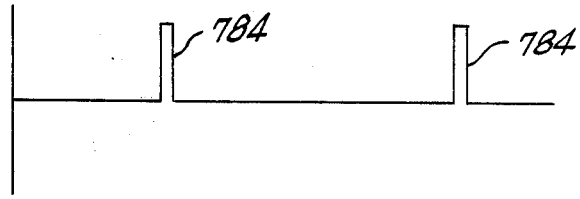
FIG. 21 is a signal diagram of a conventionally generated pitch pulse for use in a synthesizer section of the invention.
Figure 22:
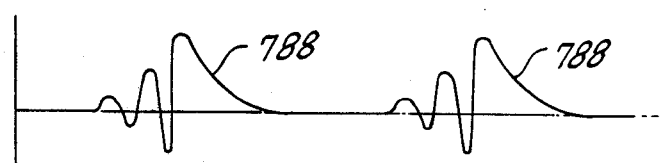
FIG. 22 is a signal diagram of a modified pitch pulse according to the invention.
Figure 23:
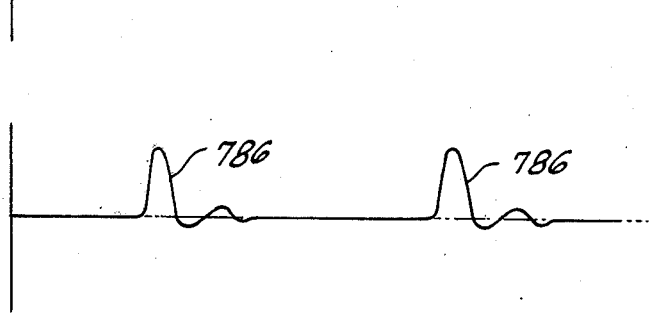
FIG. 23 is a signal diagram of the modified pitch pulse of the invention as generated by the pitch/noise generator section of the synthesizer shown in FIG. 3b.

As described above with reference to FIG. 3b, the synthesizer includes a pitch/noise generator 302. Typically, the pitch signal comprises regularly spaced pulses (784) having a generally rectangular waveform as shown in FIG. 21. However, it can be shown that the waveform of the pulses produced by human vocal cords do not have such a square wave form. The waveform is somewhat oscillatory as shown by the waveform 786 in FIG. 23. In the present invention, such a waveform 786 is produced by applying a waveform 788 such as that shown in FIG. 22 to a digital filter which then generates the proper waveform 786.

Figure 24:
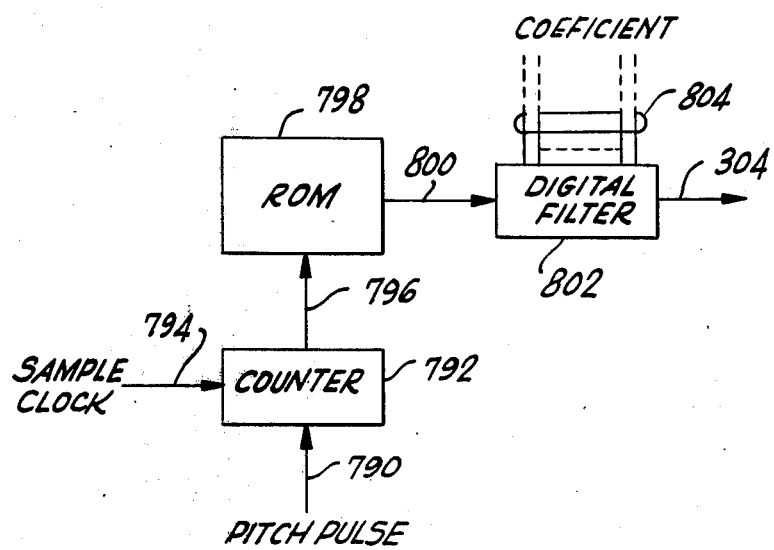
FIG. 24 is a hardware function block diagram of the pitch pulse generator of the pitch/noise generator section of the synthesizer shown in FIG. 3b.

A hardware function block diagram illustrating the generation of the waveform 786 is illustrated in FIG. 24. The pitch pulse signal on an input line 790 enables a counter 792 which then counts sample clock pulses on lines 794 and produces a count on a bus 796 which addresses a ROM 798 which produces a digital waveform output on a line 800 which is the intermediate waveform 788. The intermediate waveform signal on line 800 is applied as an input to a digital filter 802 which has connected to its coefficient inputs empirically derived coefficients which will produce the proper output waveform 786 on a line 304.

While the presently preferred embodiments for the features of the present invention have been described conceptually by way of drawings, in the actual presently preferred physical embodiment, the system of the invention is controlled and operated by means of fixed instruction sets stored in read-only memories (ROMS). It should be appreciated that the features of the invention may be practiced by a plurality of different techniques depending upon the state of the art and the particular hardware devices available. Therefore, the invention is not to be limited except by the following claims.

We claim:

1. A speech analysis and synthesis system capable of processing a plurality of speech channels in real time, said system comprising:
   an analyzer including,
   means for analyzing a plurality of electrical speech signals by Cepstrum technique to generate a pitch period parameter for each speech signal,
   means for analyzing said plurality of speech signals to generate a voiced/unvoiced decision parameter for each speech signal,
   means for analyzing said plurality of speech signals by linear prediction technique to generate a predetermined number of coefficient parameters and a power parameter for each speech signal; and
   a synthesizer including,
   pitch pulse generator means for receiving said pitch period parameters and generating pitch pulses having a corresponding pitch period,
   random noise generator means,
   switch means connected to said pitch pulse generator means and to said random noise generator means for receiving said voiced/unvoiced decision parameters, an output of said switch means being derived from said pitch pulse generator means if said decision is voiced and from said random noise generator means if said decision is invoiced,
   gain control means connected to said output of said switch means for receiving said power parameters, an output level of said gain control means being dependent upon said power parameters, and
   linear prediction filter means connected to said output of said gain control means for receiving and applying said coefficient parameters to said filter means to generate a replica of each of said plurality of speech signals at an output of said filter means.

2. A speech analysis and synthesis system comprising:
   an analyzer including,
   means for analyzing an electrical speech signal by Cepstrum technique to generate a pitch period parameter,
   means for analyzing said speech signal to generate a voiced/unvoiced decision parameter, and
   means for analyzing said speech signal by linear prediction technique to generate a predetermined number of coefficient parameters and a power parameter; and
   a synthesizer including,
   pitch pulse generator means for receiving said pitch period parameter and generating pitch pulses having a corresponding pitch period,
   random noise generator means,
   switch means connected to said pitch pulse generator means and to said random noise generator means for receiving said voiced/unvoiced decision parameter, an output of said switch means being derived from said pitch pulse generator means if said decision is voiced, and from said random noise generator means if said decision is unvoiced,
   gain control means connected to said output of said switch means for receiving said power parameter, an output level of said gain control means being dependent upon said power parameter, and
   linear prediction filter means connected to said output of said gain control means for receiving and applying said coefficient parameters to said filter means to generate a replica or said speech signal at an output of said filter means;
   wherein said means for analyzing said speech signal to generate a voiced/unvoiced decision parameter includes
   means for scanning a Cepstrum signal within an auxilliary signal range on each side of a Cepstrum peak amplitude signal,
   means for detecting and storing a range peak signal within the scanned auxilliary ranges,
   means for summing the absolute values of the signal within the auxilliary ranges to form a range signal sum,
   means for dividing said Cepstrum peak amplitude signal by said range peak signal to form a range peak factor, means for dividing said range signal sum by said Cepstrum peak amplitude signal to form an average peak factor, means for first comparing said range peak factor with predetermined upper and lower limits and generating a voiced decision parameter if said range peak factor is above said upper limit and generating an unvoiced decision parameter if said range peak factor is equal to or below said lower limit, and means for secondarily comparing said average peak factor with predetermined upper and lower limits and generating a voiced decision parameter if said average peak factor is equal to or less than said lower limit and generating an unvoiced decision parameter if said average peak factor is equal to or greater than said upper limit.

3. A speech analysis and synthesis system as defined in claim 2 wherein said means for analyzing said speech signal to generate a voiced/unvoiced decision parameter further includes:

means for thirdly comparing said Cepstrum peak amplitude signal with predetermined upper and lower limits and generating a voiced decision parameter if said Cepstrum peak amplitude is equal to or less than said lower limit and generating an unvoiced decision parameter if said Cepstrum peak amplitude is equal to or greater than said upper limit.

4. A speech analysis and synthesis system as defined in claim 3 wherein said means for analyzing said speech signal to generate a voiced/unvoiced decision parameter further includes:

means for monitoring said speech signal and counting the number of zero crossings in a predetermined time period; and means for comparing said number of zero crossings with a predetermined limit and generating an unvoiced decision parameter if said number of zero crossings is above said limit and generating a voiced decision parameter if said number of zero crossings is below said limit.

5. A speech analysis and synthesis system as defined in claim 4 wherein said means for analyzing said speech signal to generate a voiced/unvoiced decision parameter further includes:

estimate register means;

means for comparing the output of said estimate register with a first autocorrelation coefficient produced by said linear prediction technique and setting said register to said first autocorrelation coefficient value if said coefficient is equal to or less than said register value; and means for integrating the value in said register means if said coefficient is greater than said estimate register value;

means for subtracting said estimate register value from said first autocorrelation coefficient value to generate a difference value; and means for comparing said difference value with predetermined upper and lower limits and generating a voiced decision parameter if said difference is greater than said upper limit and generating an unvoiced decision parameter if said difference signal is less than said lower limit.

6. A speech analysis and synthesis system as defined in claim 5 wherein said means for analyzing said speech signals to generate a voiced/unvoiced decision parameter further includes:

means for comparing an error signal generated by said linear prediction technique with predetermined upper and lower limits and generating a voiced decision parameter if said error signal is equal to or less than said lower limit and generating an unvoiced decision parameter if said error signal is equal to or greater than said upper limit.

7. A speech analysis and synthesis system as defined in claim 6 wherein said means for analyzing electrical speech signal by Cepstrum technique includes a signal conditioning system for conditioning said Cepstrum signal which has, in the direction of an ordinate axis, an amplitude dimension of said Cepstrum signal and, in the direction of the abscissa, a quantity representing time, said signal conditioning system having, means for generating a weighting signal which linearly increases in value with the dimension in the direction of the abscissa corresponding to said quantity representing time of said Cepstrum, and means for adding said weighting signal tosaid Cepstrum signal along said dimension in the direction of the abscissa thereof to generate a weighted Cepstrum signal.

8. A speech analysis and synthesis system comrising:
an analyzer including, means for analyzing an electrical speech signal by Cepstrum technique to generate a pitch period parameter, means for analyzing said speech signal to generate a voiced/unvoiced decision parameter, and means for analyzing said speech signal by linear prediction technique to generate a predetermined number of coefficient parameters and a power parameter; and a synthesizer including, pitch pulse generator means for receiving said pitch period parameter and generating pitch pulses having a corresponding pitch period, random noise generator means, switch means connected to said pitch pulsed generator means to said random noise generator means for receiving said voiced/unvoiced decision parameter, an output of said switch means being derived from said pitch pulse generator means if said decision is voiced, and from said random noise generator means if said decision is unvoiced, gain control means connected to said output of said switch means for receiving said power parameter, an output level of said gain control means being dependent upon said power parameter, and linear prediction filter means connected to said output of said gain control means for receiving and applying said coefficient parameters to said filter means to generate a replica or said speech signal at an output of said filter means;

wherein said means for analyzing an electrical speech signal by Cepstrum technique includes means for conditioning a Cepstrum signal generated by said Cepstrum technique, said signal conditioning means generating a weighting signal which linearly increases in value during the time span of said Cepstrum and said means for conditioning said Cepstrum further adding said weighting signal to said Cepstrum during said time span to create a weighted Cepstrum signal.

9. A speech analysis and synthesis system as defined in claim 8 wherein said signal conditioning means includes:
   means for generating said weighting signal having a first adder with an output connected as an input to a register, said register having an output connected as a first input to said first adder, said first adder having as a second input an incrementing constant connected to said first adder through a first gate, said gate being enabled as an incremental element of said Cepstrum signal is gated through a second gate to a first input to a second adder, whereby said register is incremented for each element of said Cepstrum signal which is gated into said second adder; and
   means for adding said weighting signal to said Cepstrum by connecting the output of said register as a second input to said second adder, whereby the incremented output of said register is added to each element of said Cepstrum signal and an output of said second adder is said weighted Cepstrum signal.

10. A method of analyzing and synthesizing, in real time, speech signals in a plurality of speech channels, said method comprising the steps of: analyzing said speech signals by,
   analyzing each of said plurality of speech signals by a Cepstrum technique to generate a pitch period parameter,
   analyzing each of said plurality of speech signals to generate a voiced/unvoiced decision parameter, and
   analyzing each of said pluality of signals by linear prediction technique to generate a predetermined number of coefficient parameters and a power parameter; and
synthesizing said speech signals by,
   generating pitch pulses having a pitch period corresponding to said pitch period parameter generated in said first analyzing step,
   generating a random noise signal,
   switching the output of said generated pitch pulses to an output of a switch means if said voiced/unvoiced decision parameter generated during said second analysis step is voiced and switching said random noise signal to said output of said switch means if said voiced/unvoiced decision is unvoiced,
   controlling the gain of said output of said switch means with gain control means in accordance with said generated power parameter, and
   connecting the output of said gain control means to the input of linear prediction filter means and applying said coefficient parameters to said filter means to generate a replica of each of said plurality of speech signals at an output of said filter means.

11. A method of analyzing and synethesizing speech signals comprising the steps of:
analyzing said speech signals by, analyzing said electrical speech signal by a Cepstrum technique to generate a pitch period parameter,
   analyzing said speech signal to generate a voiced/unvoiced decision parameter,
   analyzing said speech signal by linear prediction technique to generate a predetermined number of coefficient parameters and a power parameter;
   and p1 synthesizing said speech signal by,
   generating pitch pulses having a pitch period corresponding to said pitch period parameter generated in said first analyzing step,
   generating a random noise signal,
   switching the output of said generated pitch pulses to an output of a switch means if said voiced/unvoiced decision parameter generated during said second analysis step is voiced and switching said random noise signal to said output of said switch means if said voiced/unvoiced decision is unvoiced,
   controlling the gain of said output of said switch means with gain control means in accordance with said generated power parameter, and
   connecting the output of said gain control means to the input of linear prediction filter means and applying said coefficient parameters to said filter means to generate a replica of said speech signal to an output of said filter means;
wherein said step of analyzing said speech signal to generate a voiced/unvoiced decision parameter includes
   scanning a Cepstrum signal within an auxilliary signal range on each side of a Cepstrum peak amplitude signal,
   detecting and storing a range peak signal within the scanned auxilliary ranges,
   summing the absolute values of the signals within the auxilliary ranges to form a range signal sum,
   dividing said Cepstrum peak amplitude signal by said range peak signal to form a range peak factor;
   dividing said range signal sum by said Cepstrum peak amplitude signal to form an average peak factor,
   first comparing said range peak factor with predetermined upper and lower limits and generating a voiced decision parameter if said range peak factor is above said upper limit and generating an unvoiced decision parameter if said range peak factor is equal to or below said lower limit, and
   secondarily comparing said average peak factor with predetermined upper and lower limits and generating a voiced decision parameter if said average peak factor is equal to or less than said lower limit and generating an unvoiced decision parameter if said average peak factor is equal to or greater than said upper limit.

12. A method of analyzing and synthesizing speech signals as defined in claim 11 wherein said step of analyzing said speech signal to generate a voiced/unvoiced decision parameter further includes:
   thirdly comparing said Cepstrum amplitude factor with predetermined upper and lower limits and generating a voiced decision parameter if said Cepstrum peak amplitude is equal to or less than said lower limit and generating an unvoiced decision parameter if said Cepstrum peak amplitude is equal to or greater than said upper limit.

13. A method of analyzing and synthesizing speech signals as defined in claim 12 wherein said step of analyzing said speech signal to generate a voiced/unvoiced decision parameter further includes:
   monitoring said speech signal and counting the number of zero crossings in a predetermined time period; and comparing said number of zero crossings with a predetermined limit and generating an unvoiced decision parameter if said number of zero crossings is above said limit and generating a voiced decision parameter if said number of zero crossings is below said limit.

14. A method of analyzing and synthesizing speech signals as defined in claim 13 wherein said step of analyzing said speech signal to generate a voiced/unvoiced decision parameter further includes:

providing an estimate register;

comparing the output of said estimate register with the first autocorrelation coefficient produced by said linear prediction technique and setting said register to said first autocrorrelation coefficient value if said coefficient is equal to or less than said register value; and integrating the value in said register means if said coefficient is greater than said estimate register value;

subtracting said estimate register value from said first autocorrelation coeficient value to generate a difference value; and comparing said difference value with predetermined upper and lower limits and generating a voiced decision parameter if said difference is greater than said upper limit and generating an unvoiced decision parameter if said difference signal is less than said lower limit.

15. A method of analyzing and synthesizing speech signals as defined in claim 14 wherein said step of analyzing said speech signals to generate a voiced/unvoiced decision parameter further includes:

comparing an error signal generated by said linear prediction technique with predetermined upper and lower limits and generating a voiced decision parameter if said error signal is equal to or less than said lower limit and generating an unvoiced decision parameter if said error signal is equal to or greater than said upper limit.

16. A method of analyzing and synthesizing speech signals comprising the steps of:

analyzing said speech signals by,
analyzing said electrical speech signal by a Cepstrum technique to generate a pitch period parameter,
analyzing said speech signal to generate a voiced-/unvoiced decision parameter,
analyzing said speech signal by linear prediction technique to generate a predetermined number of coefficient parameters and a power parameter; and synthesizing said speech signal by,
generating pitch pulses having a pitch period corresponding to said pitch period parameter generated in said first analyzing step,
generating a random noise signal,
switching the output of said generated pitch pulses to an output of a switch means if said voiced/unvoiced decision parameter generated during said second analysis step is voiced and switching said random noise signal to said output of said switch means if said voiced/unvoiced decision is unvoiced,
controlling the gain of said output of said switch means with gain control means in accordance with said generated power parameter, and connecting the output of said gain control means to the input of linear prediction filter means and applying said coefficient parameters to said filter means to generate a replica of said speech signal to an output of said filter means;

wherein said step of analyzing electrical speech signals by Cepstrum technique includes a signal conditioning step for conditioning a Cepstrum signal which has a dimension in the direction of an ordinate axis, which is the amplitude of said Cepstrum signal and has a dimension in the direction of the abscissa which is a quantity representing time, said signal conditioning step having the steps of, generating a weighting signal which linearly increases in value with the dimension in the direction of the abscissa corresponding to said quantity representing time of said Cepstrum, and adding said weighting signal to said Cepstrum signal along said dimension in the direction of the abscissa thereof to generate a weighted Cepstrum signal.

17. A method of analyzing and synthesizing speech signals comprising the steps of:

analyzing said speech signals by,
analyzing said electrical speech signal by a Cepstrum technique to generate a pitch period parameter,
analyzing said speech signal to generate a voiced-/unvoiced decision parameter,
analyzing said speech signal by linear prediction technique to generate a predetermined number of coefficient parameters and a power parameter; and synthesizing said speech signal by,
generating pitch pulses having a pitch period corresponding to said pitch period parameter generated in said first analyzing step,
generating a random noise signal,
switching the output of said generated pitch pulses to an output of a switch means if said voiced/unvoiced decision parameter generated during said second analysis step is voiced and switching said random noise signal to said output of said switch means if said voiced/unvoiced decision is unvoiced,
controlling the gain of said output of said switch means with gain control means in accordance with said generated power parameter, and 'connecting the output of said gain control means to the input of linear prediction filter means and applying said coefficient parameters to said filter means to generate a replica of said speech signal to an output of said filter means;

wherein said pitch pulse generating step includes
generating a sequence of control signals in response to receipt of said pitch period parameter, and
generating a substantially periodic, amplitude increasing pitch pulse excitation signal in response to said sequence of control signals.

18. A method of analyzing and synthesizing speech signals as defined in claim 17 wherein:
said control signal sequence generating step includes counting in a counter producing a parallel output count in response to processing clock signals; and
generating said pitch pulse excitation signal includes addressing a read-only memory means by said parallel count output from said counter, the output of said read-only memory being said excitation signal.

19. A system for analyzing a plurality of speech signals in real time and generating representative control parameters therefor, said system comprising:
- means for analyzing a plurality of electrical speech signals by Cepstrum technique to generate a pitch period parameter for each of said signals;
- means for analyzing each of said plurality of speech signals to generate a voiced/unvoiced decision parameter;
- means for analyzing each of said plurality of speed signals by linear prediction technique to generate a predetermined number of coefficent parameters and a power parameter; and
- means for combining said pitch period parameter, said voiced/unvoiced decision parameter, said coefficient parameters and said power parameter into a composite signal representative of each of said plurality of speech signals for transmission in compressed form to a point of utilization.

20. A system for analyzing a speech signal and generating representative control parameters therefor, said system comprising:
- means for analyzing an electrical speech signal by Cepstrum technique to generate a pitch period parameter;
- means for analyzing said speech signal to generate a voiced/unvoiced decision parameter;
- means for analyzing said speech signal by linear prediction technique to generate a predetermined number of coefficient parameters and a power parameters; and
- means for combining said pitch period parameter, said voiced/unvoiced decision parameter, said coefficient parameters and said power parameter into a composite signal representative of said speech signal;
- wherein said means for analyzing said speech signal to generate a voiced/unvoiced decision parameter includes
  - means for scanning a Cepstrum signal within an auxilliary signal range on each side of a Cepstrum peak amplitude signal,
  - means for detecting and storing a range peak signal within the scanned auxilliary ranges;
  - means for summing the absolute values of the signals within the auxilliary ranges to form a range signal sum,
  - means for dividing said Cepstrum peak amplitude signal by said range peak signal to form a range peak factor,
  - means for dividing said range signal sum by said Cepstrum peak amplitude signal to form an average peak factor,
  - means for first comparing said range peak factor with predetermined upper and lower limits and generating a voiced decision parameter if said range peak factor is above said upper limit and generating an unvoiced decision parameter if said range peak factor is equal to or below said lower limit, and
  - means for secondarily comparing said average peak factor with predetermined upper and lower limits and generating a voiced decision parameter if said average peak factor is equal to or less than said lower limit and generating an unvoiced decision parameter if said average peak factor is equal to or greater than said upper limit.

21. A speech analysis system as defined in claim 20 wherein said means for analyzing said speech signal to generate a voiced/unvoiced decision parameter further includes:
- means for thirdly comparing said Cepstrum peak amplitude signal with predetermined upper and lower limits and generating a voiced decision parameter if said Cepstrum peak amplitude is equal to or less than said lower limit and generating an unvoiced decision parameter if said Cepstrum peak amplitude is equal to or greater than said upper limit.

22. A speech analysis system as defined in claim 21 wherein said means for analyzing said speech signal to generate a voiced/unvoiced decision parameter further includes:
- means for monitoring said speech signal and counting the number of zero crossings in a predetermined time period; and
- means for comparing said number of zero crossings with a predetermined limit and generating an unvoiced decision parameter if said number of zero crossings is above said limit and generating a voiced decision parameter if said number of zero crossings is below said limit.

23. A speech analysis system as defined in claim 22 wherein said means for analyzing said speech signal to generate a voiced/unvoiced decision parameter further includes:
- estimate register means;
- means for comparing the output of said estimate register with the first autocorrelation coefficient produced by said linear prediction technique and setting said register to said first autocorrelation coefficient value if said coefficient equal to or less than said register value; and
- means for integrating the value in said register means if said coefficient is greater than said estimate register value;
- means for subtracting said estimate register value from said first autocorrelation coefficient value to generate a difference value; and
- means for comparing said difference value with predetermined upper and lower limits and generating a voiced decision parameter if said difference is greater than said upper limit and generating an unvoiced decision parameter if said difference signal is less than said lower limit.

24. A speech analysis system as defined in claim 23 wherein said means for analyzing said speech signals to generate a voiced/unvoiced decision parameter further includes:
- means for comparing an error signal generated by said linear prediction technique with predetermined upper and lower limits and generating a voiced decision parameter if said error signal is equal to or less than said lower limit and generating an unvoiced decision parameter if said error signal is equal to or greater than said upper limit.

25. A speech analysis system as defined in claim 24 wherein said means for analyzing an electrical speech signal by Cepstrum technique includes a signal conditioning system for conditioning said Cepstrum signal which has, in the direction of the ordinate axis, an amplitude dimension of said Cepstrum signal and, in the direction of the abscissa, a quantity representing time, said signal conditioning system having:

means for generating a weighting signal which linearly increases in value with the dimension in the direction of the abscissa corresponding to said quantity representing time of said Cepstrum signal; and means for adding said weighting signal to said Cepstrum signal along said dimension in the direction of the abscissa thereof to generate a weighted Cepstrum signal.

26. A system for analyzing a speech signal and generating representative control parameters therefor, said system comprising:

means for analyzing an electrical speech signal by Cepstrum technique to generate a pitch period parameter;

means for analyzing said speech signal to generate a voiced/unvoiced decision parameter;

means for analyzing said speech signal by linear prediction technique to generate a predetermined number of coefficient parameters and a power parameter; and means for combining said pitch period parameter, said voiced/unvoiced decision parameter, said coefficient parameters and said power parameter into a composite signal representative of said speech signal;

wherein said means for analyzing an electrical speech signal by Cepstrum technique includes a signal conditioning system for conditioning a Cepstrum signal which has, in the direction of an ordinate axis, an amplitude dimension of said Cepstrum signal and, in the direction of the abscissa, a quantity representing time, said signal conditioning system having, means for generating a weighting signal which linearly increases in value with the dimension in the direction of the abscissa corresponding to said quantity representing time of said Cepstrum, and means for adding said weighting signal to said Cepstrum signal along said dimension in the direction of the abscissa thereof to generate a weighted Cepstrum signal.

27. A method for analyzing a plurality of speech signals in real time and generating representative control parameters therefor, said method comprising the steps of:

analyzing each of a plurality of speech signals by a Cepstrum technique to generate a pitch period parameter;

analyzing each of said plurality of speech signals to generate a voiced/unvoiced decision parameter; and analyzing each of said plurality of speech signals by linear prediction technique to generate a predetermined number of coefficient parameters and a power parameter.

28. A method for analyzing a speech signal and generating representative control parameters therefor, said method comprising the steps of:

analyzing said speech signal by a Cepstrum technique to generate a pitch period parameter;

analyzing said speech signal to generate a voiced/unvoiced decision parameter; and analyzing said speech signal by linear prediction technique to generate a predetermined number of coefficient parameters and a power parameter;

wherein said step of analyzing said speech signal to generate a voiced/unvoiced decision parameter includes scanning a Cepstrum signal within an auxilliary signal range on each side of a Cepstrum peak amplitude signal, detecting and storing a range peak signal within the scanned auxilliary ranges, summing the absolute values of the signals within the auxilliary ranges to form a range signal sum, dividing said Cepstrum peak amplitude signal by said range peak signal to form a range peak factor, dividing said range signal sum by said Cepstrum peak amplitude signal to form an average peak factor, first comparing said range peak factor with predetermined upper and lower limits and generating an voiced decision parameter if said range peak factor is above said upper limit and generating an unvoiced decision parameter if said range peak factor is equal to or below said lower limit, and secondarily comparing said average peak factor with predetermined upper and lower limits and generating a voiced decision parameter if said average peak factor is equal to or less than said lower limit and generating an unvoiced decision parameter if said average peak factor is equal to or greater than said upper limit.

29. A method of analyzing a speech signal as defined in claim 28 wherein said step of analyzing said speech signal to generate a voiced/unvoiced decision parameter further includes:

thirdly comparing said Cepstrum peak amplitude signal with predetermined upper and lower limits and generating a voiced decision parameter if said Cepstrum peak amplitude is equal to or less than said lower limit and generating an unvoiced decision parameter if said Cepstrum peak amplitude is equal to or greater than said upper limit.

30. A method of analyzing a speech signal as defined in claim 29 wherein said step of analyzing said speech signal to generate a voiced/unvoiced decision parameter further includes:

monitoring said speech signal and counting the number of zero crossings in a predetermined time period; and comparing said number of zero crossings with a predetermined limit and generating an unvoiced decision parameter if said number of zero crossings is above said limit and generating a voiced decision parameter if said number of zero crossings is below said limit.

31. A method analyzing a speech signal as defined in claim 30 wherein said step of analyzing said speech signal to generate a voiced/unvoiced decision parameter further includes:

providing an estimate register;

comparing the output of said estimate register with the first autocorrelation coefficient produced by said linear prediction technique and setting said register to said first autocorrelation coefficient value if said coefficient is equal to or less than said register value;

integrating the value in said register means if said coefficient is greater than said estimate register value;

substracting said estimate register value from said first autocorrelation coefficient value to generate a difference value; and comparing said difference value with predetermined upper and lower limits and generating a voiced decision parameter if said difference is greater than said upper limit and generating an unvoiced decision parameter if said difference signal is less than said lower limit.

32. A method of analyzing a speech signal as defined in claim 30 wherein said step of analyzing said speech signals to generate a voiced/unvoiced decision parameter further includes:

comparing an error signal generated by said linear prediction technique with predetermined upper and lower limits and generating a voiced decision parameter if said error signal is equal to or less than said lower limit and generating an unvoiced decision parameter if said error signal is equal to or greater than said upper limit.

33. A method of analyzing a speech signal as defined in claim 32 wherein said step of analyzing by a Cepstrum technique includes conditioning said Cepstrum signal, which has, in the direction of the ordinate axis, an amplitude dimension of said Cepstrum signal and, in the direction of the abscissa, a quantity representing time, said signal conditioning step including:

generating a weighting signal which linearly increases in value with the dimension in the direction of the abscissa corresponding to said quantity representing time of said Cepstrum signal; and adding said weighting signal to said Cepstrum signal along said dimension in the direction of the abscissa thereof to generate a weighted Cepstrum signal.

34. A method for analyzing a speech signal and generating representative control parameters therefor, said method comprising the steps of:

analyzing said speech signal by a Cepstrum technique to generate a pitch period parameter;

analyzing said speech signal to generate a voiced/unvoiced decision parameter; and analyzing said speech signal by linear prediction technique to generate a predetermined number of coefficient parameters and a power parameter;

wherein said analyzing electrical speech signal by Cepstrum technique includes the step of conditioning a Cepstrum signal, which has a dimension in the direction of an ordinate axis which is the amplitude of said Cepstrum signal and has dimension in the direction of the abscissa which is a quantity representing time, said signal conditioning step including, generating a weighting signal which linearly increases in value with the dimension in the direction of the abscissa corresponding to said quantity representing time of said Cepstrum, and adding said weighting signal to said Cepstrum signal along said dimension in the direction of the abscissa thereof to generate a weighted Cepstrum signal.

35. A system for synthesizing speech in real time from a plurality of sets of control parameters representative of a plurality of speech signals, said parameters including a pitch period parameter, a voiced/unvoiced decision parameter, a predetermined number of coefficient parameters and a power parameter, said system comprising:

pitch pulse generator means for receiving said pitch period parameter and generating pitch pulses having a corresponding pitch period;

random noise generator means;

switch means connected to said pitch pulse generator means and to said random noise generator means for receiving said voiced/unvoiced decision parameter, an output of said switch means being derived from the output of said pitch pulse generator means if said decision is voiced and from said random noise generator means if said decision is unvoiced;

gain control means connected to said output of said switch means, for receiving said power parameter, an output level of said gain control means being dependent upon said power parameter; and linear prediction filter means connected to said output of said control means for receiving and applying said coefficient parameters to said filter means to generate a replica of each of said plurality of speech signals at an output of said filter means.

36. A system for synthesizing speech from a combination of control parameters representative of a speech signal, said parameters including a pitch period parameter, a voiced/unvoiced decision parameter, a predetermined number of coefficient parameters and a power parameter, said system comprising:

pitch pulse generator means for receiving said pitch period parameter and generating pitch pulses having a corresponding pitch period;

random noise generator means;

switch means connected to said pitch pulse generator means and to said random noise generator means for receiving said voiced/unvoiced decision parameter, an output of said switch means being derived from the output of said pitch pulse generator means if said decision is voiced and from said random noise generator means if said decision is unvoiced;

gain control means connected to said output of said switch means, for receiving said power parameter, an output level of said gain control means being dependent upon said power parameter; and linear prediction filter means connected to said output of said control means, for receiving and applying said coefficient parameters to said filter means to generate a replica of said speech signal at an output of said filter means;

wherein said pitch pulse generator means includes means responsive to receipt of said pitch period parameter for generating a sequence of control signals, and means responsive to said sequence of control signals for generating a substantially periodic, amplitude increasing pitch pulse excitation signal.

37. A method of synthesizing speech in real time from a plurality of combinations of control parameters representative of a plurality of speech signals, said parameter including a pitch period parameter, a voiced/unvoiced decision parameter, a predetermined number of coefficient parameters and a power parameter, said method comprising the steps of:

receiving said pitch period parameter and generating pitch period pulses having a corresponding pitch period;

generating a random noise signal;

switching said pitch period signals to an output of a switch means when said voiced/unvoiced decision parameter is voiced and switching said random noise signal to said output of said switch means if said voiced/unvoiced decision parameter is unvoiced;

controlling the gain of the output of said switch means in response to said power parameter; and connecting the output of said gain controlled switch means to a linear prediction filter means connected to said coefficient parameters to generate a replica of each of said plurality of speech signals at an output of said filter means.

38. A method of synthesizing speech from a combination of control parameters representative of a speech signal, said parameters including a pitch period parameter, a voiced/unvoiced decision parameter, a predetermined number of coefficient parameters and a power parameter, said method comprising the steps of:

receiving said pitch period parameter and generating pitch period pulses having a corresponding pitch period;

generating a random noise signal;

switching said pitch period signals to an output of a switch means when said voiced/unvoiced decision parameter is voiced and switching said random noise signal to said output of said switch means if said voiced/unvoiced decision parameter is unvoiced;

controlling the gain of the output of said switch means in response to said power parameter; and connecting the output of said gain controlled switch means to a linear prediction filter means connected to said coefficient parameters to generate a replica of said speech signal at an output of said filter means;

wherein said pitch pulse generating step includes generating a sequence of control signals in response to receipt of said pitch period parameter; and generating a substantially periodic, amplitude increasing pitch period pulse excitation signal in response to said sequence of control signals.

39. A system for speech analysis and synthesis, comprising:

an analyzer including,
means for analyzing a plurality of speech signal channels in real time by Cepstrum technique to generate a pitch period parameter for each of said speech signal channels, means for analyzing each of said plurality of speech signal channels, to generate a voiced/unvoiced decision parameter for each channel, means for analyzing each of said plurality of speech signal channels by linear prediction technique to generate a predetermined number of coefficient parameters and a power parameter for each of said channels, means for combining said pitch period parameter, coefficient parameters, power parameter, and voiced/unvoiced decision parameter into a set of parameters for each of said speech channels, means for combining said sets of parameters for each speech channel into a single transmission channel signal, means for transmitting said single transmission channel signal to a receiver, and means for separating said received single transmission channel signal into respective sets of parameters for a respective plurality of synthesis channels; and a synthesizer including,
pitch pulse generator means for receiving said pitch period parameter for each of said synthesis channels and generating pitch pulses having a corresponding pitch period, random noise generator means, switch means connected to said pitch pulse generator means and to said random noise generator means for receiving said voiced/unvoiced decision parameters for each of said synthesis channels, an output of said switch means being said pitch pulse generator means if said decision for a channel is voiced and said output of said switch means being said random noise generator means if said decision for a channel is unvoiced, gain control means connected to said output of said switch means for receiving said power parameters for each of said synthesis channels, an output level of said gain control means being dependent upon said power parameter for each of said synthesis channels, and linear prediction filter means connected to said output of said gain control means for receiving and applying said coefficient parameters for each of said synthesis channels to said filter means to generate a replica of each of said speech signals at an output of said filter means.

40. A system for speech analysis and synthesis, comprising:

an analyzer including,
means for analyzing a plurality of speech signal channels by Cepstrum technique to generate a pitch period parameter for each of said speech signal channels, means for analyzing each of said plurality of speech signal channels, to generate a voiced/unvoiced decision parameter for each channel, means for analyzing each of said plurality of speech signal channels by linear prediction technique to generate a predetermined number of coefficient parameters and a power parameter for each of said channels, means for combining said pitch period parameter, coefficient parameters, power parameter, and voiced/unvoiced decision parameter into a set of parameters for each of said speech channels, means for combining said sets of parameters for each speech channel into a single transmission channel signal, means for transmitting said single transmission channel signal to a receiver, and means for separating said received single transmission channel signal into respective sets of parameters for a respective plurality of synthesis channels; and a synthesizer including,
pitch pulse generator means for receiving said pitch period parameter for each of said synthesis channels and generating pitch pulses having a corresponding pitch period, random noise generator means, switch means connected to said pitch pulse generator means and to said random noise generator means for receiving said voiced/unvoiced decision parameters for each of said synthesis channels, an output of said switch means being said pitch pulse generator means if said decision for a channel is voiced and said output of said switch means being said random noise generator means if said decision for a channel is unvoiced, gain control means connected to said output of said switch means for receiving said power parameters for each of said synthesis channels, an output level of said gain control means being dependent upon said power parameter for each of said synthesis channels, and linear prediction filter means connected to said output of said gain control means for receiving and applying said coefficient parameters for each of said synthesis channels to said filter means to generate a replica of each of said speech signals at an output of said filter means;

wherein said means for analyzing each of said plurality of speech signal channels said speech signal to generate a voiced/unvoiced decision parameter includes means for scanning a Cepstrum signal within an auxilliary signal range on each side of a Cepstrum peak amplitude signal, means for detecting and storing a range peak signal within the scanned auxilliary ranges, means for summing the absolute values of the signal within the auxilliary ranges to form a range signal sum, means for dividing said Cepstrum peak amplitude signal by said range peak signal to form a range peak factor, means for dividing said range signal sum by said Cepstrum peak amplitude signal to form an average peak factor, means for first comparing said range peak factor with predetermined upper and lower limits and generating a voiced decision parameter if said range peak factor is above said upper limit and generating an unvoiced decision parameter if said range peak factor is equal to or below said lower limit, and means for secondarily comparing said average peak factor with predetermined upper and lower limits and generating a voiced decision parameter if said average peak factor is equal to or less than said lower limit and generating an unvoiced decision parameter if said average peak factor is equal to or greater than said upper limit.

41. A speech analysis and synthesis system as defined in claim 40 wherein said means for analyzing said speech signal to generate a voiced/unvoiced decision parameter further includes:

means for thirdly comparing said Cepstrum peak amplitude factor signal with predetermined upper and lower limits and generating a voiced decision parameter if said Cepstrum peak amplitude is equal to or less than said lower limit and generating an unvoiced decision parameter if said Cepstrum peak amplitude is equal to or greater than said upper limit.

42. A speech analysis and synthesis system as defined in claim 41 wherein said means for analyzing said speech signal to generate a voiced/unvoiced decision parameter further includes:

means for monitoring said speech signal and counting the number of zero crossings in a predetermined time period; and means for comparing said number of zero crossings with a predetermined limit and generating an unvoiced decision parameter if said number of zero crossings is above said limit and generating a voiced decision parameter if said number of zero crossings is below said limit.

43. A speech analysis and synthesis system as defined in claim 42 wherein said means for analyzing said speech signal to generate a voiced/unvoiced decision parameter further includes:

estimate register means;

means for comparing the output of said estimate register with the first autocorrelation coefficient produced by said linear prediction technique and setting said register to said first autocorrelation coefficient value if said coefficient is equal to or less than said register value;

means for integrating the value in said register means if said coefficient is greater than said estimate register value;

means for subtracting said estimate register value from said first autocorrelation coefficient value to generate a difference value; and means for comparing said difference value with predetermined upper and lower limits and generating a voiced decision parameter if said difference is greater than said upper limit and generating an unvoiced decision parameter if said difference signal is less than said lower limit.

44. A speech analysis and synthesis system as defined in claim 43 wherein said means for analyzing said speech signals to generate a voiced/unvoiced decision parameter further includes:

means for comparing an error signal generated by said linear prediction technique with predetermined upper and lower limits and generating a voiced decision parameter if said error signal is equal to or less than said lower limit and generating an unvoiced decision parameter if said error signal is equal to or greaer than said upper limit.

45. A system for synthesizing speech as defined in claim 44 wherein said pitch pulse generator means includes:

means responsive to receipt of said pitch period parameter for generating a sequence of control signals; and means responsive to said sequence of control signals for generating a substantially periodic, amplitude increasing pitch pulse excitation signal.

46. A speech analysis and synthesis system as defined in claim 45 wherein said means for analyzing the plurality of speech signal channels by Cepstrum technique to generate a pitch period parameter includes a signal conditioning system for conditioning said Cepstrum signal which has, in the direction of an ordinate axis, an amplitude dimension of said Cepstrum signal and, in the direction of the abscissa, a quantity representing time, said signal conditioning system having:

means for generating a weighting signal which linearly increases in value with the dimension in the direction of the abscissa corresponding to said quantity representing time to said Cepstrum signal; and means for adding weighting signal to said Cepstrum signal along said dimension in the direction of the abscissa thereof to generate a weighted Cepstrum signal.

47. A system for speech analysis and synthesis, comprising:

an analyzer including, means for analyzing a plurality of speech signal channels by Cepstrum technique to generate a pitch period parameter for each of said speech signal channels, means for analyzing each of said plurality of speech signal channels, to generate a voiced/unvoiced decision parameter for each channel, means for analyzing each of said llurality of speech signal channels by linear prediction technique to generate a predetermined number of coefficient parameters and a power parameter for each of said channels, means for combining said pitch period parameter, coefficient parameters, power parameter, and voiced/unvoiced decision parameter into a set of parameters for each of said speech channels, means for combining said sets of parameters for each speech channel into a single transmission channel signal, means for transmitting said single transmission channel signal to a receiver, and means for separating said received single transmission channel signal into respective sets of parameters for a respective plurality of synthesis channels; and a synthesizer including, pitch pulse generator means for receiving said pitch period parameter for each of said synthesis channels and generating pitch pulses having a corresponding pitch period, random noise generator means, switch means connected to said pitch pulse generator means and to said random noise generator means for receiving said voiced/unvoiced decision parameters for each of said synthesis channels, an output of said switch means being said pitch pulse generator means if said decision for a channel is voiced and said output of said switch means being said random noise generator means if said decision for a channel is unvoiced, gain control means connected to said output of said switch means for receiving said power parameters for each of said synthesis channels, an output level of said gain control means being dependent upon said power parameter for each of said synthesis channels, and linear prediction filter means connected to said output of said gain control means for receiving and applying said coefficient parameters for each of said synthesis channels to said filter means to generate a replica of each of said speech signals at an output of said filter means;

wherein said means for analyzing the plurality of speech signal channels by Cepstrum technique to generate a pitch period parameter includes a signal conditioning system for conditioning a Cepstrum signal which has, in the direction of an ordinate axis, an amplitude dimension of said Cepstrum signal and, in the direction of the abscissa, a quantity representing time, said signal conditioning system having, means for generating a weighting signal which linearly increases in value with the dimension in the direction of the abscissa corresponding to said quantity representing time of said Cepstrum, and means for adding said weighting signal to said Cepstrum signal along said dimension in the direction of the abscissa thereof to generate a weighted Cepstrum signal.

48. A system for analyzing a plurality of speech signal channels, in real time, said system comprising an analyzer including:

means for analyzing a plurality of speech signal channels by Cepstrum technique to generate a pitch period parameter for each of said speech signal channels;

means for analyzing each of said plurality of speech signal channels to generate a voiced/unvoiced decision parameter for each channel; and means for analyzing each of said plurality of speech signal channels by linear prediction technique to generate a predetermined number of coefficient parameters and a power parameter for each of said channels.

49. A system for analyzing a plurality of speech signal channels, comprising an analyzer including:

means for analyzing a plurality of speech signal channels by Cepstrum technique to generate a pitch period parameter for each of said speech signal channels;

means for analyzing each of said plurality of speech signal channels to generate a voiced/unvoiced decision parameter for each channel; and means for analyzing each of said plurality of speech signal channels by linear prediction technique to generate a predetermined number of coefficient parameters and a power parameter for each of said channels;

wherein said means for analyzing said speech signal to generate a voiced/unvoiced decision parameter includes means for scanning a Cepstrum signal within an auxilliary signal range on each side of Cepstrum peak amplitude signal, means for detecting and storing a range peak signal within the scanned auxilliary ranges, means for summing the absolute values of the signal within the auxilliary ranges to form a range signal sum, means for dividing said Cepstrum peak amplitude signal by said range peak signal to form a range peak factor;

means for dividing said range signal sum by said Cepstrum peak amplitude signal to form an average peak factor, means for first comparing said range peak factor with predetermined upper and lower limits and generating a voiced decision parameter if said range peak factor is above said upper limit and generating an unvoiced decision parameter if said range peak factor is equal to or below said lower limit, and means for secondarily comparing said average peak factor with predetermined upper and lower limits and generating a voiced decision parameter if said average peak factor is equal to or less than said lower limit and generating an unvoiced decision parameter if said average peak factor is equal to or greater than said upper limit.

50. A speech analysis system as defined in claim 49 wherein said means for analyzing said speech signal to generate a voiced/unvoiced decision parameter further includes:

means for thirdly comparing said Cepstrum peak amplitude signal with predetermined upper and lower limits and generating a voiced decision parameter if said Cepstrum peak amplitude is equal to or less than said lower limit and generating an unvoiced decision parameter if said Cepstrum peak amplitude is equal to or greater than said upper limit.

51. A speech analysis system as defined in claim 50 wherein said means for analyzing said speech signal to generate a voiced/unvoiced decision parameter further includes:
   means for monitoring said speech signal and counting the number of zero crossings in a predetermined time period; and
   means for comparing said number of zero crossings with a predetermined limit and generating an unvoiced decision parameter if said number of zero crossings is above said limit and generating a voiced decision parameter if said number of zero crossings is below said limit.

52. A speech analysis system as defined in claim 51 wherein said means for analyzing said speech signal to generate a voiced/unvoiced decision parameter further includes:
   estimate register means;
   means for comparing the output of said estimate register with a first autocorrelation coefficient produced by said linear prediction technique and setting said register to said first autocorrelation coefficient value if said coefficient is equal to or less than said register value; and
   means for integrating the value in said register means if said coefficient is greater than said estimate register value;
   means for subtracting said estimate register value from said first autocorrelation coefficient value to generate a difference value; and
   means for comparing said difference value with predetermined upper and lower limits and generating a voiced decision parameter if said difference is greater than said upper limit and generating an unvoiced decision parameter if said difference signal is less than said lower limit.

53. A speech analysis system as defined in claim 52 wherein said means for analyzing said speech signals to generate a voiced/unvoiced decision parameter further includes:
   means for comparing an error signal generated by said linear prediction technique with predetermined upper and lower limits and generating a voiced decision parameter if said error signal is equal to or less than said lower limit and generating an unvoiced decision parameter if said error signal is equal to or greater than said upper limit.

54. A speech analysis system as defined in claim 53 wherein said means for analyzing a plurality of speech signal channels by Cepstrum technique includes a signal conditioning system for conditioning said Cepstrum signal which has, in the direction of an ordinate axis, an amplitude dimension of said Cepstrum signal and, in the direction of the abscissa, a quantity representing time, said signal conditioning system having:
   means for generating a weighting signal which linearly increases in value with the dimension in the direction of the abscissa corresponding to said quantity representing time of said Cepstrum signal; and
   means for adding said weighting signal to said Cepstrum signal along said dimension in the direction of the abscissa thereof to generate a weighted Cepstrum signal.

55. A system for analyzing a plurality of speech signal channels, comprising an analyzer including:
   means for analyzing a plurality of speech signal channels by Cepstrum technique to generate a pitch period parameter for each of said speech signal channels;
   means for analyzing each of said plurality of speech signal channels to generate a voiced/unvoiced decision parameter for each channel; and
   means for analyzing each of said plurality of speech signal channels by linear prediction technique to generate a predetermined number of coefficient parameters and a power parameter for each of said channels;
   wherein said means for analyzing a plurality of speech signal channels by Cepstrum technique includes a signal conditioning system for conditioning a Cepstrum signal which has, in the direction of an ordinate axis, an amplitude dimension of said Cepstrum signal and, in the direction of the abscissa, a quantity representing time, said signal conditioning system having,
      means for generating a weighting signal which linearly increases in value with the dimension in the direction of the abscissa corresponding to said quantity representing time of said Cepstrum, and
      means for adding said weighting signal to said Cepstrum signal along said dimension in the direction of the abscissa thereof to generate a weighted Cepstrum signal.

56. A system for synthesizing speech in a plurality of speech synthesis channels in real time, said system comprising:
   pitch pulse generator means for receiving pitch period parameters for each of said synthesis channels and generating pitch pulses having a corresponding pitch period;
   random noise generator means;
   switch means connected to said pitch pulse generator means and to said random noise generator means for receiving voiced/unvoiced decision parameters for each of said synthesis channels, an output of said switch means being derived from said pitch pulse generator means if said decision for a channel is voiced and from said random noise generator means if said decision for a channel is unvoiced;
   gain control means connected to said output of said switch means for receiving power parameters for each of said synthesis channels, an output level of said gain control means being dependent upon said power parameter for each of said synthesis channels; and
   linear prediction filter means connected to said output of said gain control means for receiving and applying a plurality of coefficient parameters for each of said synthesis channels to said filter means to generate a replica of each of said speech signals at an output of said filter means.

57. A system for speech synthesis, comprising a synthesizer including:
   pitch pulse generator means for receiving pitch period parameters for each of said synthesis channels and generating pitch pulses having a corresponding pitch period;
   random noise generator means;

switch means connected to said pitch pulse generator means and to said random noise generator means for receiving voiced/unvoiced decision parameters for each of said synthesis channels, an output of said switch means being derived from said pitch pulse generator means if said decision for a channel is voiced and from said random noise generator means if said decision for a channel is unvoiced;

gain control means connected to said output of said switch means for receiving power parameters for each of said synthesis channels, an output level of said gain control means being dependent upon said power parameter for each of said synthesis channels; and linear prediction filter means connected to said output of said gain control means for receiving and applying a plurality of coefficient parameters for each of said synthesis channels to said filter means to generate a replica of each of said speech signals at an output of said filter means;

wherein said pitch pulse generator means includes
means responsive to receipt of said pitch period parameters for generating a sequence of control signals, and
means responsive to said sequence of control signals for generating a substantially periodic, amplitude increasing pitch pulse excitation signal.

58. A system for speech synthesis as defined in claim 57 wherein:

said control signal sequence generating means includes a counter producing a parallel output count in response to processing clock signals; and said means for generating said pitch pulse excitation signal includes a read-only memory means addressed by said parallel count output from said counter, the output of said read-only memory being said excitation signal.

59. A speech analysis system for generating in real time a plurality of sets of paramaters each representative of an analog speech signal as produced by a model speech generator, said system comprising:

means for sampling each of said analog speech signals to produce a plurality of digital speech data signals;

means for separating a fixed number of said speech data signals into a frame of speech data signals;

means for analyzing said frame of said speech data with a Cepstrum generator to produce a digital speech pitch period parameter for said frame of data;

means for analyzing said frame of data with a linear prediction coefficient generator to produce a plurality of digital coefficeint parameters and a digital power parameter;

means for analyzing said frame of speech data with a voiced/unvoiced decision generator to produce a digital voiced/unvoiced decision parameter; and means for combining, for each speech signal, said digital pitch period parameter, said plurality of digital coefficient parameters, said digital power parameter, and said digital voiced/unvoiced decision parameter into a set of parameters representative of each of said analog speech signals.

60. A speech analysis system for generating a set of parameters representative of an analog speech signal as produced by a model speech generator, said system comprising:

means for sampling said analog speech signal to produce a plurality of digital speech data signals;

means for separating a fixed number of said speech data signals into a frame of speech data signals;

means for analyzing said frame of said speech data with a Cepstrum generator to produce a digital speech pitch period parameter for said frame of data;

means for analyzing said frame of data with a linear prediction coefficient generator to produce a plurality of digital coefficient parameters and a digital power parameter;

means for analyzing said frame of speech data with a voiced/unvoiced decision generator to produce a digital voiced/unvoiced decision parameter; and means for combining said digital pitch period parameter, said plurality of digital coefficient parameters, said digital power parameter, and said digital voiced/unvoiced decision paramater into said set of parameters representative of said analog speech signal;

wherein said means for analyzing said frame of speech data to produce a digital voiced/unvoiced decision parameter includes means for scanning a Cepstrum signal within an auxilliary signal range on each side of a Cepstrum peak amplitude signal, means for detecting and storing a range peak signal within the scanned auxilliary ranges, means for summing the absolute values of the signal within the auxilliary ranges to form a range signal sum, means for dividing said Cepstrum peak amplitude signal by said range peak signal to form a range peak factor, means for dividing said range signal sum by said Cepstrum peak amplitude signal to form an average peak factor, means for first comparing said range peak factor will predetermined upper and lower limits and generating a voiced decision parameter if said range peak factor is above said upper limit and generating an unvoiced decision parameter if said range peak factor is equal to or below said lower limit, and means for secondarily comparing said average peak factor with predetermined upper and lower limits and generating a voiced decision parameter if said average peak factor is equal to or less than said lower limit and generating an unvoiced decision parameter if said average peak factor is equal to or greater than said upper limit.

61. A speech analysis system as defined in claim 60 wherein said means for analyzing said frame of speech data to produce a voiced/unvoiced decision parameter further includes:

means for thirdly comparing said Cepstrum peak amplitude signal factor with predetermined upper and lower limits and generating a voiced decision parameter if said Cepstrum peak amplitude is equal to or less than said lower limit and generating an unvoiced decision parameter if said Cepstrum peak amplitude is equal to or greater than said upper limit.

62. A speech analysis system as defined in claim 61 wherein said means for analyzing said frame of speech data to produce a voiced/unvoiced decision parameter further includes:

means for monitoring said speech signal and counting the number of zero crossings in a predetermined time period; and means for comparing said number of zero crossings with a predetermined limit and generating an unvoiced decision parameter if said number of zero crossings is above said limit and generating a voiced decision parameter if said number of zero crossings is below said limit.

63. A speech analysis system as defined in claim 62 wherein said means for analyzing said frame of speech data to produce a voiced/unvoiced decision parameter further includes:

estimate register means;

means for comparing the output of said estimate register with a first autocorrelation coefficient produced by said linear prediction technique and setting said register to said first autocorrelation coefficient value if said coefficient is equal to or less than said register value; and means for integrating the value in said register means if said coefficient is greater than said estimate register value;

means for subtracting said estimate register value from said first autocorrelation coefficient value to generate a difference value; and means for comparing said difference value with predetermined upper and lower limits and generating a voiced decision parameter if said difference is greater than said upper limit and generating an unvoiced decision parameter if said difference signal is less than said lower limit.

64. A speech analysis system as defined in claim 63 wherein said means for analyzing said frame of speech data to produce a voiced/unvoiced decision parameter further includes:

means for comparing an error signal generated by said linear prediction techinque with predetermined upper and lower limits and generating a voiced decision parameter if said error signal is equal to or less than said lower limit and generating an unvoiced decision parameter if said error signal is equal to or greater than said upper limit.

65. A speech analysis system as defined in claim 64 wherein said means for said means for analyzing said frame of speech data by Cepstrum technique includes a signal conditioning system for conditioning said Cepstrum signal which has, in the direction of an ordinate axis, an amplitude dimension of said Cepstrum signal and, in the direction of the abscissa, a quantity representing time, said signal conditioning system having:

means for generating a weighting signal which linearly increases in value with the dimension in the direction of the abscissa corresponding to said quantity representing time of said Cepstrum signal; and means for adding said weighting signal to said Cepstrum signal along said dimension in the direction of the abscissa thereof to generate a weighted Cepstrum signal.

66. A speech analysis system for generating a set of parameters representative of an analog speech signal as produced by a model speech generator, said system comprising:

means for sampling said analog speech signal to produce a plurality of digital speech data signals;

means for separating a fixed number of said speech data signals into a frame of speech data signals;

means for analyzing said frame of said speech data with a Cepstrum generator to produce a digital speech pitch period parameter for said frame of data;

means for analyzing said frame of data with a linear prediction coefficient generator to produce a plurality of digital coefficient parameters and a digital power parameter;

means for analyzing said frame of speech data with a voiced/unvoiced decision generator to produce a digital voiced/unvoiced decision parameter; and means for combining said digital pitch period parameter, said plurality of digital coefficient parameters, said digital power parameter, and said digital voiced/unvoiced decision parameter into said set of parameters representative of said analog speech signal;

wherein said means for analyzing said frame of speech data by Cepstrum technique includes a signal conditioning system for conditioning a Cepstrum signal which has, in the direction of an ordinate axis, an amplitude dimension of said Cepstrum signal and, in the direction of the abscissa, a quantity representing time, said signal conditioning system having, means for generating a weighting signal which linearly increases in value with the dimension in the direction of the abscissa corresponding to said quantity representing time of said Cepstrum, and means for adding said weighting signal to said Cepstrum signal along said dimension in the direction of the abscissa thereof to generate a weighted Cepstrum signal.

67. A pitch pulse generating system for use in a speech synthesizer which receives a pitch period parameter, said pitch pulse generating system comprising:

means responsive to receipt of said pitch period parameter for generating a sequence of control signals; and means responsive to said sequence of control signals for generating a substantially periodic, amplitude increasing pitch pulse excitation signal.

68. A pitch pulse generating system as defined in claim 67 wherein:

said control signal sequence generating means includes a counter producing a parallel output count in response to processing clock signals; and said means for generating said pitch pulse excitation signal includes a read-only memory means addressed by said parallel count output from said counter and the output of said read-only memory being said excitation signal.

69. A speech analysis system for generating a set of parameters representative of an analog speech signal as produced by a model speech generator, said system comprising:

means for sampling said analog speech signal to produce a plurality of digital speech data signals;

means for separating a fixed number of said speech data signals into a frame of speech data signals;

means for analyzing said frame of said speech data with a Cepstrum generator to produce a digital speech pitch period parameter for said frame of data;

means for analyzing said frame of data with a linear prediction coefficient generator to produce a plurality of digital coefficient parameters and a digital power parameter;

means for analyzing said frame of speech data with a voiced/unvoiced decision generator to produce a digital voiced/unvoiced decision parameter; and means for combining said digital pitch period parameter, said plurality of digital coefficient parameters, said digital power parameter, and said digital voiced/unvoiced decision parameter into said set of parameters representative of said analog speech signal;

wherein said means for analyzing said frame of said speech data to produce a speech pitch period parameter includes means for interpolating between sample values in a sample data Cepstrum signal, and wherein a pitch period value is initially chosen as corresponding to a maximum amplitude sample, said interpolating system having means for storing said maximum value sample, an immediately preceding sample, and an immediately following sample, means for subtracting said immediately preceding sample from said immediately following sample to form a sample difference, means for dividing said sample difference by four to form a sample difference quotient, means for adding said immediately preceding sample to said immediately following sample to form a sample sum, means for dividing said sample sum by two to form a sample sum quotient, means for subtracting said maximum amplitude sample from said sample sum quotient to form a weighted sample sum quotient, means for dividing said sample difference quotient by said weighted sample sum quotient to form a pitch value increment, and means for adding said pitch value increment to said pitch period value to form an interpolated pitch value.

70. A speech analysis system for generating a set of parameters representative of an analog speech signal as produced by a model speech generator, said system comprising:

means for sampling said analog speech signal to produce a plurality of digital speech data signals;

means for separating a fixed number of said speech data signals into a frame of speech data signals;

means for analyzing said frame of said speech data with a Cepstrum generator to produce a digital speech pitch period parameter for said frame of data;

means for analyzing said frame of data with a linear prediction coefficient generator to produce a plurality of digital coefficient parameters and a digital power parameter;

means for analyzing said frame of speech data with a voiced/unvoiced decision generator to produce a digital voiced/unvoiced decision parameter; and means for combining said digital pitch period parameter, said plurality of digital coefficient parameters, said digital power parameter, and said digital voiced/unvoiced decision parameter into said set of parameters representative of said analog speech signal;

wherein said means for analyzing said frame of data with a linear prediction coefficient generator includes a signal conditioning means for a frame of digital speech data samples, said signal conditioning means having means for generating a window signal having a characteristic waveshape which is completed in a data sample span which is shorter than said frame of data;

means for centering said window signal data span in said frame of speech data samples; and means for multiplying corresponding sample positions of said frame of speech data and said window signal to generate a limited and windowed frame of speech data.

71. A speech analysis system as defined in claim 70 wherein said means for analyzing said frame of said speech data to produce a speech pitch period parameter includes means for interpolating between sample values in a sample data Cepstrum signal, and wherein a pitch period value is initially chosen as corresponding to a maximum amplitude sample, said interpolating system having:

means for storing said maximum value sample, an immediately preceding sample, and an immediately following sample;

means for subtracting said immediately preceding sample from said immediately following sample to form a sample difference;

means for dividing said sample difference by four to form a sample difference quotient;

means for adding said immediately preceding sample to said immediately following sample to form a sample sum;

means for dividing said sample sum by two (2) to form a sample sum quotient;

means for subtracting said maximum amplitude sample from said sample sum quotient to form a weighted sample sum quotient;

a means for dividing said sample difference quotient by said weighted sample sum quotient to form a pitch value increment; and means for adding said pitch value increment to said pitch period value to form an interpolated pitch value.

72. A speech analysis and synthesis system for generating a plurality of sets of parameters representative of a plurality of analog speech signals as produced by a model speech generator and reproducing in real time from said sets of parameters a replica of each of said analog speech signals, said system comprising:

an analyzer including, means for sampling each analog speech signal to produce a plurality of digital speech data signals, means for separating said plurality of said speech data signals into a frame of speech data signals, means for analyzing said frame of speech data with a Cepstrum generator to produce a digital pitch period parameter for said frame of data, means for analyzing said frame of speech data with a voiced/unvoiced decision generator to produce a digital voiced/unvoiced decision parameter, and means for analyzing said frame of speech data with a linear prediction coefficient generator to produce a plurality of digital coefficient parameters and a digital power parameter; and a synthesizer including, digital pitch pulse generator means for receiving said digital pitch period parameter and generating for each original speech signal pitch pulses having a corresponding pitch period, digital random noise generator means, switch means connected to said pitch pulse generator means and to said random noise generator means for receiving said digital voiced/unvoiced decision parameter, an output of said switch means being derived from said pitch pulse generator means if said decision is voiced and from said random noise generator means if said decision in unvoiced, gain control means connected to said output of said switch means for receiving said digital power parameter, a digital output level of said gain control means being dependent upon said power parameter, digital linear prediction filter means connected to said output of said gain control means for receiving and applying said digital coefficient parameters to said filter means to generate a digital replica of each of said original speech signals at an output of said filter means, and means for converting said digital output of said filter means to a corresponding analog replica of each of said original analog speech signals.

73. A speech analysis and synthesis system for generating a set of parameters representative of an analog speech signal as produced by a model speech generator and reproducing from said set of parameters a replica of said analog speech signal, said system comprising:

an analyzer including,
means for sampling said analog speech signal to produce a plurality of digital speech data signals,
means for separating said plurality of said speech data signals into a frame of speech data signals,
means for analyzing said frame of speech data with a Cepstrum generator to produce a digital pitch period parameter for said frame of data,
means for analyzing said frame of speech data with a voiced/unvoiced decision generator to produce a digital voiced/unvoiced decision parameter, and
means for analyzing said frame of speech data with a linear prediction coefficient generator to produce a plurality of digital coefficient parameters and a digital power parameter; and a synthesizer including,
digital pitch pulse generator means for receiving said digital pitch period parameter and generating pitch pulses having a corresponding pitch period,
digital random noise generator means,
switch means connected to said pitch pulse generator means and to said random noise generator means for receiving said digital voiced/unvoiced decision parameter, an output of said switch means being derived from said pitch pulse generator means if said decision is voiced and from said random noise generator means if said decision is unvoiced,
gain control means connected to said output of said switch means for receiving said digital power parameter, a digital output level of said gain control means being dependent upon said power parameter,
digital linear prediction filter means connected to said output of said gain control means for receiving and applying said digital coefficient parameters to said filter means to generate a digital replica of said speech signal at an output of said filter means, and
means for converting said digital output of said filter means to a corresponding analog replica of said analog speech signal;

wherein said means for analyzing said frame of speech data to produce a digital voiced/unvoiced decision parameter includes
means for scanning a Cepstrum signal within an auxilliary signal range on each side of a Cepstrum peak amplitude signal,
means for detecting and storing a range peak signal within the scanned auxilliary ranges,
means for summing the absolute values of the signal within the auxiliary ranges to form a range signal sum,
means for dividing said Cepstrum peak amplitude signal by said range peak signal to form a range peak factor;
means for dividing said range signal sum by said Cepstrum peak amplitude signal to form an average peak factor,
means for first comparing said range peak factor with predetermined upper and lower limits and generating a voiced decision parameter if said range peak factor is equal to or above said upper limit and generating an unvoiced decision if said range peak factor is equal to or below said lower limit, and
means for secondarily comparing said average peak factor with predetermined upper and lower limits and generating a voiced decision parameter if said average peak factor is equal to or less than said lower limit and generating an unvoiced decision parameter if said average peak factor is equal to or greater than said upper limit.

74. A speech analysis and synthesis system as defined in claim 73 wherein said means for analyzing said frame of speech data signal to produce a digital voiced/unvoiced decision parameter further includes:
means for thirdly comparing said Cepstrum peak amplitude signal with predetermined upper and lower limits and generating a voiced decision parameter if said Cepstrum peak amplitude is equal to or less than said lower limit and generating an unvoiced decision parameter if said Cepstrum peak amplitude is equal to or greater than said upper limit.

75. A speech analysis and synthesis system as defined in claim 74 wherein said means for analyzing said frame of speech data to produce a digital voiced/unvoiced decision parameter further includes:
means for monitoring said speech signal and counting the number of zero crossings in a predetermined time period; and
means for comparing said number of zero crossings with a predetermined limit and generating an unvoiced decision parameter if said number of zero crossings is above said limit and generating a voiced decision parameter if said number of zero crossings is below said limit.

76. A speech analysis and synthesis system as defined in claim 75 wherein said means for analyzing said frame of speech data to produce a digital voiced/unvoiced decision parameter further includes:
estimate register means;

means for comparing the output of said estimate register with a first autocorrelation coefficient produced by said linear prediction technique and setting said register to said first autocorrelation coefficient value if said coefficient is equal to or less than said register value;

means for integrating the value in said register means if said coefficient is greater than said estimate register value;

means for subtracting said estimate register value from said first autocorrelation coefficient value to generate a difference value; and means for comparing said difference value with predetermined upper and lower limits and generating a voiced decision parameter if said difference is greater than said upper limit and generating an unvoiced decision parameter if said difference signal is less than said lower limit.

77. A speech analysis and synthesis system as defined in claim 75 wherein said means for analyzing said frame of speech data to produce a digital voiced/unvoiced decision parameter further includes;

means for comparing an error signal generated by said linear prediction coefficient generator with predetermined upper and lower limits and generating a voiced decision parameter if said error signal is equal to or less than said lower limit and generating an unvoiced decision parameter if said error signal is equal to or greater than said upper limit.

78. A speech analysis and synthesis system as defined in claim 77 wherein said means for analyzing said frame of speech data with a Cepstrum generator includes a signal conditioning system for conditioning said Cepstrum signal which has, in the direction of an ordinate axis, an amplitude dimension of said Cepstrum signal, and, in the direction of the abscissa, a quantity representing time, said signal conditioning system having:

means for generating a weighting signal which linearly increases in value with the dimension in the direction of the abscissa corresponding to said quantity representing time of said Cepstrum signal; and means for adding said weighting signal to said Cepstrum signal along said dimension in the direction of the abscissa thereof to generate a weighted Cepstrum signal.

79. A speech analysis and synthesis system for generating a set of parameters representative of an analog speech signal as produced by a model speech generator and reproducing from said set of parameters a replica of said analog speech signal, said system comprising:

an analyzer including, means for sampling said analog speech signal to produce a plurality of digital speech data signals, means for separating said plurality of said speech data signals into a frame of speech data signals, means for analyzing said frame of speech data with a Cepstrum generator to produce a digital pitch period parameter for said frame of data, means for analyzing said frame of speech data with a voiced/unvoiced decision generator to produce a digital voiced/unvoiced decision parameter, and means for analyzing said frame of speech data with a linear prediction coefficient generator to produce a plurality of digital coefficient parameters and a digital power parameter; and a synthesizer including, digital pitch pulse generator means for receiving said digital pitch period parameter and generating pitch pulses having a corresponding pitch period, digital random noise generator means, switch means connected to said pitch pulse generator means and to said random noise generator means for receiving said ditigal voiced/unvoiced decision parameter, an output of said switch means being derived from said pitch pulse generator means if said decision is voiced and from said random noise generator means if said decision is unvoiced, gain control means connected to said output of said switch means for receiving said digital power parameter, a digital output level of said gain control means being dependent upon said power parameter, digital linear prediction filter means connected to said output of said gain control means for receiving and applying said ditigal coefficient parameters to said filter means to generate a digital replica of said speech signal at an output of said filter means, and means for converting said digital output of said filter means to a corresponding analog replica of said analog speech signal;

wherein said means for analyzing said frame of speech data with a Cepstrum generator includes a signal conditioning system for conditioning a Cepstrum signal which has, in the direction of an ordinate axis, an amplitude dimension of said Cepstrum signal and, in the direction of the abscissa, a quantity representing time, said signal conditioning system having, means for generating a weighting signal which linearly increases in value with the dimension in the direction of the abscissa corresponding to said quantity representing time of said Cepstrum, and means for adding said weighting signal to said Cepstrum signal along said dimension in the direction of the abscissa thereof to generate a weighted Cepstrum signal.

80. A speech analysis and synthesis system for generating a set of parameters representative of an analog speech signal as produced by a model speech generator and reproducing from said set of parameters a replica of said analog speech signal, said system comprising:

an analyzer including, means for sampling said analog speech signal to produce a plurality of digital speech data signals, means for separating said plurality of said speech data signals into a frame of speech data signals, means for analyzing said frame of speech data with a Cepstrum generator to produce a digital pitch period parameter for said frame of data, means for analyzing said frame of speech data with a voiced/unvoiced decision generator to produce a digital voiced/unvoiced decision parameter, and means for analyzing said frame of speech data with a linear prediction coefficient generator to produce a plurality of digital coefficient parameters and a digital power parameter; and a synthesizer including, digital pitch pulse generator means for receiving said digital pitch period parameter and generating pitch pulses having a corresponding pitch period, digital random noise generator means, switch means connected to said pitch pulse generator means and to said random noise generator means for receiving said digital voiced/unvoiced decision parameter, an output of said switch means being derived from said pitch pulse generator means if said decision is voiced and from said random noise generator means if said decision is unvoiced, gain control means connected to said output of said switch means for receiving said digital power parameter, a digital output level of said gain control means being dependent upon said power parameter, digital linear prediction filter means connected to said output of said gain control means for receiving and applying said digital coefficient parameters to said filter means to generate a digital replica of said speech signal at an output of said filter means, and means for converting said digital output of said filter means to a corresponding analog replica of said analog speech signal;

wherein said digital pitch pulse generator means comprises means responsive to receipt of said digital pitch period parameter, for generating a sequence of control signals, and means responsive to said sequence of control signals for generating a substantially periodic, amplitude increasing pitch pulse excitation signal.

81. A speech analysis and synthesis system as defined in claim 80 wherein:

said control signal sequence generating means includes a counter producing a parallel output count in response to processing clock signals; and said means for generating said pitch pulse excitation signal includes a read-only memory means addressed by said parallel count output from said counter and the output of said read-only memory being said excitation signal.

82. A speech analysis and synthesis system for generating a set of parameters representative of an analog speech signal as produced by a model speech generator and reproducing from said set of parameters a replica of said analog speech signal, said system comprising:

an analyzer including,
means for sampling said analog speech signal to produce a plurality of digital speech data signals,
means for separating said plurality of said speech data signals into a frame of speech data signals,
means for analyzing said frame of speech data with a Cepstrum generator to produce a digital pitch period parameter for said frame of data,
means for analyzing said frame of speech data with a voiced/unvoiced decision generator to produce a digital voiced/unvoiced decision parameter, and
means for analyzing said frame of speech data with a linear prediction coefficient generator to produce a plurality of digital coefficient parameters and a digital power parameter; and a synthesizer including,
digital pitch pulse generator means for receiving said digital pitch period parameter and generating pitch pulses having a corresponding pitch period, digital random noise generator means, switch means connected to said pitch pulse generator means and to said random noise generator means for receiving said digital voiced/unvoiced decision parameter, an output of said switch means being derived from said pitch pulse generator means if said decision is voiced and from said random noise generator means if said decision is unvoiced, gain control means connected to said output of said switch means for receiving said digital power parameter, a digital output level of said gain control means being dependent upon said power parameter, digital linear prediction filter means connected to said output of said gain control means for receiving and applying said digital coefficient parameters to said filter means to generate a digital replica of said speech signal at an output of said filter means, and means for converting said digital output of said filter means to a corresponding analog replica of said analog speech signal;

wherein said means for analyzing said frame of said speech data to produce a digital pitch period parameter includes means for interpolating between sample values in a sample data Cepstrum signal wherein a pitch period value is initially chosen as corresponding to a maximum amplitude sample, said interpolating system having means for storing said maximum value sample, an immediately preceding sample, and an immediately following sample, means for substracting said immediately preceding sample from said immediately following sample to form a sample difference, means for dividing said sample difference by four to form a sample difference quotient, means for adding said immediately preceding sample to said immediately following sample to form a sample sum, means for dividing said sample sum by two to form a sample sum quotient, means for subtracting said maximum amplitude sample from said sample sum quotient to form a weighted sample sum quotient, means for dividing said sample difference quotient by said weighted sample sum quotient to form a pitch value increment, and means for adding said pitch value increment to said pitch period value to form an interpolated pitch value.

83. A speech analysis and synthesis system for generating a set of parameters representative of an analog speech signal as produced by a model speech generator and reproducing from said set of parameters a replica of said analog speech signal, said system comprising:

an analyzer including,
means for sampling said analog speech signal to produce a plurality of digital speech data signals,
means for separating said plurality of said speech data signals into a frame of speech data signals,
means for analyzing said frame of speech data with a Cepstrum generator to produce a digital pitch period parameter for said frame of data, means for analyzing said frame of speech data with a voiced/unvoiced decision generator to produce a digital voiced/unvoiced decision parameter, and means for analyzing said frame of speech data with a linear prediction coefficient generator to produce a plurality of digital coefficient parameters and a digital power parameter; and a synthesizer including, digital pitch pulse generator means for receiving said digital pitch period parameter and generating pitch pulses having a corresponding pitch period, digital random noise generator means, switch means connected to said pitch pulses generator means and to said random noise generator means for receiving said digital voiced/unvoiced decision parameter, an output of said switch means being derived from said pitch pulse generator means if said decision is voiced and from said random noise generator means if said decision is unvoiced, gain control means connected to said output of said switch means for receiving said digital power parameter, a digital output level of said gain control means being dependent upon said power parameter, digital linear prediction filter means connected to said output of said gain control means for receiving and applying said digital coefficient parameters to said filter means to generate a digital replica of said speech signal at an output of said filter means, and means for converting said digital output of said filter means to a corresponding analog replica of said analog speech signal;

wherein said means for analyzing said frame of data with a linear prediction coefficient generator includes a signal conditioning means for a frame of digital speech data samples, said signal conditioning means having means for generating a window signal having a characteristic waveshape which is completed in a data sample span which is shorter than said frame of data, means for centering said window signal data sample span in said frame of speech data samples, and means for multiplying corresponding sample positions of said frame of speech data and said window signal to generate a limited and windowed frame of speech data.

84. A speech analysis and synthesis system as defined in claim 83 wherein said means for analyzing said frame of said speech data to produce a digital pitch period parameter includes means for interpolating between sample values in a sample data Cepstrum signal wherein a pitch period value is initially chosen as corresponding to a maximum amplitude sample, said interpolating system having:

means for storing said maximum value sample, an immediately preceding sample, and an immediately following sample;

means for subtracting said immediately preceding sample from said immediately following sample to form a sample difference;

means for dividing said sample difference by four to form a sample difference quotient;

means for adding said immediately preceding sample to said immediately following sample to form a sample sum;

means for dividing said sample sum by two (2) to form a sample sum quotient;

means for subtracting said maximum amplitude sample from said sample sum quotient to form a weighted sample sum quotient;

means for dividing said sample difference quotient by said weighted sample sum quotient to form a pitch value increment; and means for adding said pitch value increment to said pitch period value to form an interpolated pitch value.

85. A speech synthesis system for generating in real time an analog replica of each of a plurality of original analog speech signals represented by corresponding sets of digital parameters, each set of said parameters including a digital speech pitch period parameter, a digital voiced/unvoiced decision parameter, a plurality of digital coefficient parameters and a digital power parameter, said synthesis system including:

digital pitch pulse generator means for receiving said digital pitch period parameter and generating pitch pulses having a corresponding pitch period;

digital random noise generator means;

switch means connected to said pitch pulse generator means and to said random noise generator means for receiving said digital voiced/unvoiced decision parameter, an output of said switch means being derived from said pitch pulse generator means if said decision is voiced and from said random noise generator means if said decision is unvoiced;

gain control means connected to said output of said switch means for receiving said digital power parameter, a digital output level of said gain control means being dependent upon said power parameter;

digital linear prediction filter means connected to said output of said gain control means for receiving and applying said digital coefficient parameters to said filter means to generate a digital replica of each of said plurality of speech signals at an output of said filter means; and means for converting said digital output of said filter means to a corresponding analog replica of each of said plurality of analog speech signals.

86. A speech synthesis system for generating an analog replica of an original analog speech signal represented by a set of digital parameters, said parameters including a digital speech pitch period parameter, a digital voiced/unvoiced decision parameter, a plurality of digital coefficient parameters and a digital power parameter, said synthesis system including:

digital pitch pulse generator means for receiving said digital pitch period parameter and generating pitch pulses having a corresponding pitch period;

digital random noise generator means;

switch means connected to said pitch pulse generator means and to said random noise generator means for receiving said digital voiced/unvoiced decision parameter, an output of said switch means being derived from said pitch pulse generator means if said decision is voiced and from said random noise generator means if said decision is unvoiced;

gain control means connected to said output of said switch means for receiving said digital power parameter, a digital output level of said gain control means being dependent upon said power parameter;

digital linear prediction filter means connected to said output of said gain control means for receiving and applying said digital coefficient parameters to said filter means to generate a digital replica of said speech signal at an output of said filter means; and means for converting said digital output of said filter means to a corresponding analog replica of said analog speech signal;

wherein said digital pitch pulse generator means includes means responsive to receipt of said digital pitch period parameter, for generating a sequence of control signals, and means responsive to said sequence of control signals for generating a substantially periodic, amplitude increasing pitch pulse excitation signal.

87. A speech synthesis system as defined in claim 86 wherein:

said control signal sequence generating means includes a counter producing a parallel output count in response to processing clock signals; and said means for generating said pitch pulse excitation signal includes a read-only memory means addressed by said parallel count output from said counter and the output of said read-only memory being said excitation signal.

88. A signal conditioning system for conditioning a Cepstrum signal having as a dimension, in the direction of the ordinate axis, the amplitude of said Cepstrum signal and as a dimension, in the direction of the abscissa, a quantity representing time, said signal conditioning comprising:

means for generating a weighting signal which linearly increases in value with the dimension in the direction of the abscissa corresponding to said quantity representing time of said Cepstrum signal; and means for adding said weighting signal to said Cepstrum signal along said dimension in the direction of the abscissa thereof to generate a weighted Cepstrum signal.

89. A signal conditioning system for conditioning a Cepstrum signal as defined in claim 88 wherein:

said means for generating said weighting signal includes a first adder having an output connected as an input to a register, said register having an output connected as a first input to said first adder, said first adder having as a second input an incrementing constant connected to said first adder through a first gate, said gate being enabled as an incremental element of said Cepstrum signal is gated through a second gate to a first input to a second adder, whereby said register is incremented for each element of said Cepstrum signal which is gated into said second adder; and said means for adding said weighting signal to said Cepstrum signal includes means for connecting the output of said register as a second input to said second adder, whereby the incremented output of said register is added to each element of said Cepstrum signal and an output of said second adder is said weighted Cepstrum signal.

90. A method for conditioning a Cepstrum signal having as a dimension in the direction of the ordinate axis the amplitude of said Cepstrum signal and as a dimension in the direction of the abscissa a quantity representing time, said method comprising the steps of:

generating a weighting signal which linearly increases in value with the dimension in the direction of the abscissa corresponding to said quantity representing time of said Cepstrum signal; and adding said weighting signal to said Cepstrum signal along said dimension in the direction of the abscissa thereof to generate a weighted Cepstrum signal.

91. A system for generating a voiced/unvoiced decision parameter in a speech analysis system wherein a pitch parameter is generated by a Cepstrum technique and coefficient parameters are generated by a linear prediction technique, said system comprising:

means for scanning said Cepstrum signal within an auxilliary sample range on each side of a Cepstrum peak amplitude sample;

means for detecting and storing a range peak sample within the scanned auxilliary ranges;

means for summing the absolute values of the samples within the auxilliary ranges to form a range sample sum;

means for dividing said Cepstrum peak amplitude sample by said range peak sample to form a range peak factor;

means for dividing said range sample sum by said Cepstrum peak amplitude sample to form an average peak factor;

means for first comparing said range peak factor with predetermined upper and lower limits and generating an unvoiced decision parameter if said range peak factor is above said upper limit and generating an unvoiced decision parameter if said range peak factor is equal to or below said lower limit; and means for secondly comparing said average peak factor with predetermined upper and lower limits and generating a voiced decision parameter if said average peak factor is equal to or less than said lower limit and generating an unvoiced decision parameter if said average peak factor is equal to or greater than said upper limit.

92. A signal conditioning system for a frame of digital speech data samples, said system comprising:

means for generating a window signal having a characteristic waveshape which is completed in a data sample span which is shorter than said frame of data;

means for centering said window signal data sample span in said frame of speech data samples; and means for multiplying corresponding sample positions of said frame of speech data and said window signal to generate a limited and windowed frame of speech data.

* * * * *

UNITED STATES PATENT AND TRADEMARK OFFICE
CERTIFICATE OF CORRECTION

PATENT NO. : 4,058,676

DATED : November 15, 1977

INVENTOR(S) : ARTHUR L. WILKES, FRED B. WADE and ROBERT L. THOMPSON

It is certified that error appears in the above-identified patent and that said Letters Patent are hereby corrected as shown below:

Column 1, line 42, "noticable" should be --noticeable--.

Column 3, line 30, "preceeding" should be --preceding--.

Column 6, line 50, "multiplexer" should be --multiplexed--.

Column 8, line 31, "require" should be --requires--;
          line 52, "Cesptrum" should be --Cepstrum--.

Column 9, line 2, "latter" should be --later--.

Column 10, line 51, "3" should be --3a--.

Column 12, line 7, "3" should be --3a--.

Column 13, line 58, the subscript "-m" in the first term of Eq. 2 should be -- -n --.

Column 16, line 24, "defind" should be --defined--;
           line 31, "3" should be --3a--;
           line 48, the expression should be:

$$\text{--}X_p = X_\emptyset + \frac{X_\emptyset(a-c)}{2(a+c-2b)}\text{--}.$$

Column 18, line 1, delete "a".

Column 20, line 68, "criteria" should be --criterion--.

Column 21, line 51, "270" should be --720--.

UNITED STATES PATENT AND TRADEMARK OFFICE
CERTIFICATE OF CORRECTION

PATENT NO. : 4,058,676

DATED : November 15, 1977

INVENTOR(S) : ARTHUR L. WILKES, FRED B. WADE and ROBERT L. THOMPSON

It is certified that error appears in the above-identified patent and that said Letters Patent are hereby corrected as shown below:

Column 24, line 8, "invoiced" should be --unvoiced--.

Column 26, line 22, "tosaid" should be --to said--;
          line 26, "comrising" should be --comprising--;
          line 42, "pulsed" should be --pulse--;
          line 43, after "means", first occurrence, insert --and--;
          line 58, "or" should be --of--.

Column 27, line 27, after "of:" start a new paragraph beginning with the word --analyzing--;
          line 62, after "by," begin a new subparagraph with the word --analyzing--.

Column 28, line 2, delete "pl" and begin a new paragraph with the word --synthesizing--;
          line 21, "to" should be --at--.

Column 29, line 15, "autocrrelation" should be --autocorrelation--.

Column 30, line 48, after "power paramater," delete "'" and begin another subparagraph with "con-".

Column 31, lines 31-32, "parameters" should be --parameter--.

Column 32, line 36, after "coefficient" insert --is--.

Column 34, line 20, "an" should be --a--.

Column 35, line 1, "substracting" should be --subtracting--.

UNITED STATES PATENT AND TRADEMARK OFFICE
CERTIFICATE OF CORRECTION

PATENT NO. : 4,058,676  Page 3 of 3

DATED : November 15, 1977

INVENTOR(S) : ARTHUR L. WILKES, FRED B. WADE and ROBERT L. THOMPSON

It is certified that error appears in the above–identified patent and that said Letters Patent are hereby corrected as shown below:

Column 39, line 52, delete "factor".

Column 41, line 8, "llurality" should be --plurality--.

Column 45, lines 52-54, delete "plurality of digital coefficeint generator to produce a", and change the spelling of "coefficeint" to --coefficient--.

Column 46, line 40, after "factor" "will" should be --with--.

Column 47, line 38, "technique" should be --technique--; line 45, delete "for said means".

Column 52, line 27, after "factor" delete "is equal to or"; line 28, after "decision" insert --parameter--.

Column 57, line 15, "pulses" should be --pulse--.

Signed and Sealed this

Tenth Day of July 1979

[SEAL]

Attest:

LUTRELLE F. PARKER

Attesting Officer  Acting Commissioner of Patents and Trademarks